(12) United States Patent
Miyazaki

(10) Patent No.: US 12,017,662 B2
(45) Date of Patent: Jun. 25, 2024

(54) RUNNING SUPPORT SYSTEM FOR VEHICLE AND RUNNING SUPPORT METHOD FOR VEHICLE

(71) Applicant: TOYOTA JIDOSHA KABUSHIKI KAISHA, Toyota (JP)

(72) Inventor: Tsutomu Miyazaki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 153 days.

(21) Appl. No.: 17/588,498

(22) Filed: Jan. 31, 2022

(65) Prior Publication Data

US 2022/0258741 A1  Aug. 18, 2022

(30) Foreign Application Priority Data

Feb. 12, 2021 (JP) .................................. 2021-021275

(51) Int. Cl.
*B60W 40/10* (2012.01)
*B60W 40/09* (2012.01)
*B60W 40/105* (2012.01)

(52) U.S. Cl.
CPC .......... *B60W 40/105* (2013.01); *B60W 40/09* (2013.01); *B60W 2520/28* (2013.01); *B60W 2552/53* (2020.02); *B60W 2555/20* (2020.02)

(58) Field of Classification Search
CPC .............. B60W 40/105; B60W 40/09; B60W 2520/28; B60W 2552/53; B60W 2555/20; B60W 30/162; B60W 30/18145; B60W 2050/146; B60W 2552/40; B60W 50/14; B60W 2530/20; B60W 2720/10; B60W 40/00; B60W 50/00; B60W 50/08
See application file for complete search history.

(56) References Cited

U.S. PATENT DOCUMENTS

| | | | |
|---|---|---|---|
| 10,384,648 B1 * | 8/2019 | Chapin | ............... B60R 25/2009 |
| 2017/0313323 A1 * | 11/2017 | Tseng | ................ B60W 50/0097 |
| 2017/0334254 A1 * | 11/2017 | Limbrunner | .......... B60W 40/12 |
| 2019/0367041 A1 * | 12/2019 | Nakano | ................. G06F 21/554 |
| 2020/0339119 A1 * | 10/2020 | Ohmura | ................ B60W 30/12 |

FOREIGN PATENT DOCUMENTS

| | | |
|---|---|---|
| JP | 2004-074892 A | 3/2004 |
| JP | 2013-129254 A | 7/2013 |
| JP | 2016-78730 A | 5/2016 |
| JP | 2017-144975 A | 8/2017 |

(Continued)

OTHER PUBLICATIONS

U.S. Appl. No. 17/563,048, filed Dec. 28, 2021, Miyazaki.

*Primary Examiner* — Joseph J Dallo
(74) *Attorney, Agent, or Firm* — Oblon, McClelland, Maier & Neustadt, L.L.P.

(57) ABSTRACT

A running support system executes: a temperature acquisition process of acquiring a tire temperature; an appropriate value setting process of deriving, as a candidate value for a vehicle speed appropriate value, a value to be smaller as the tire temperature is lower, and setting the vehicle speed appropriate value based on the candidate value; and a support process of at least either notifying a driver of the vehicle speed appropriate value or decelerating a vehicle in a case where a vehicle speed exceeds the vehicle speed appropriate value.

13 Claims, 9 Drawing Sheets

(56) References Cited

FOREIGN PATENT DOCUMENTS

| | | | | |
|---|---|---|---|---|
| JP | 2018-083447 A | 5/2018 | | |
| JP | 2021-088230 A | 6/2021 | | |
| WO | WO-2008088304 A2 * | 7/2008 | ............ | B60T 8/1725 |
| WO | WO-2016078782 A1 * | 5/2016 | ............ | A01B 63/112 |
| WO | WO-2016102377 A1 * | 6/2016 | ............ | B60C 11/246 |

\* cited by examiner

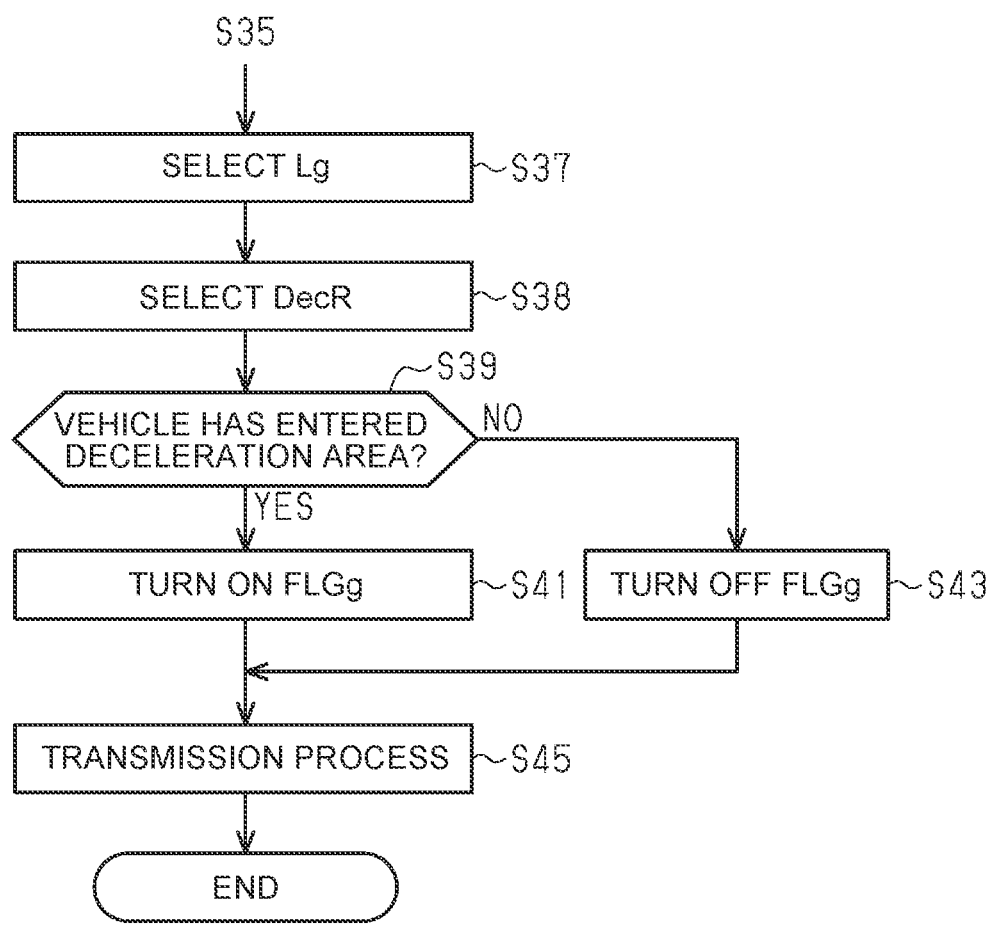

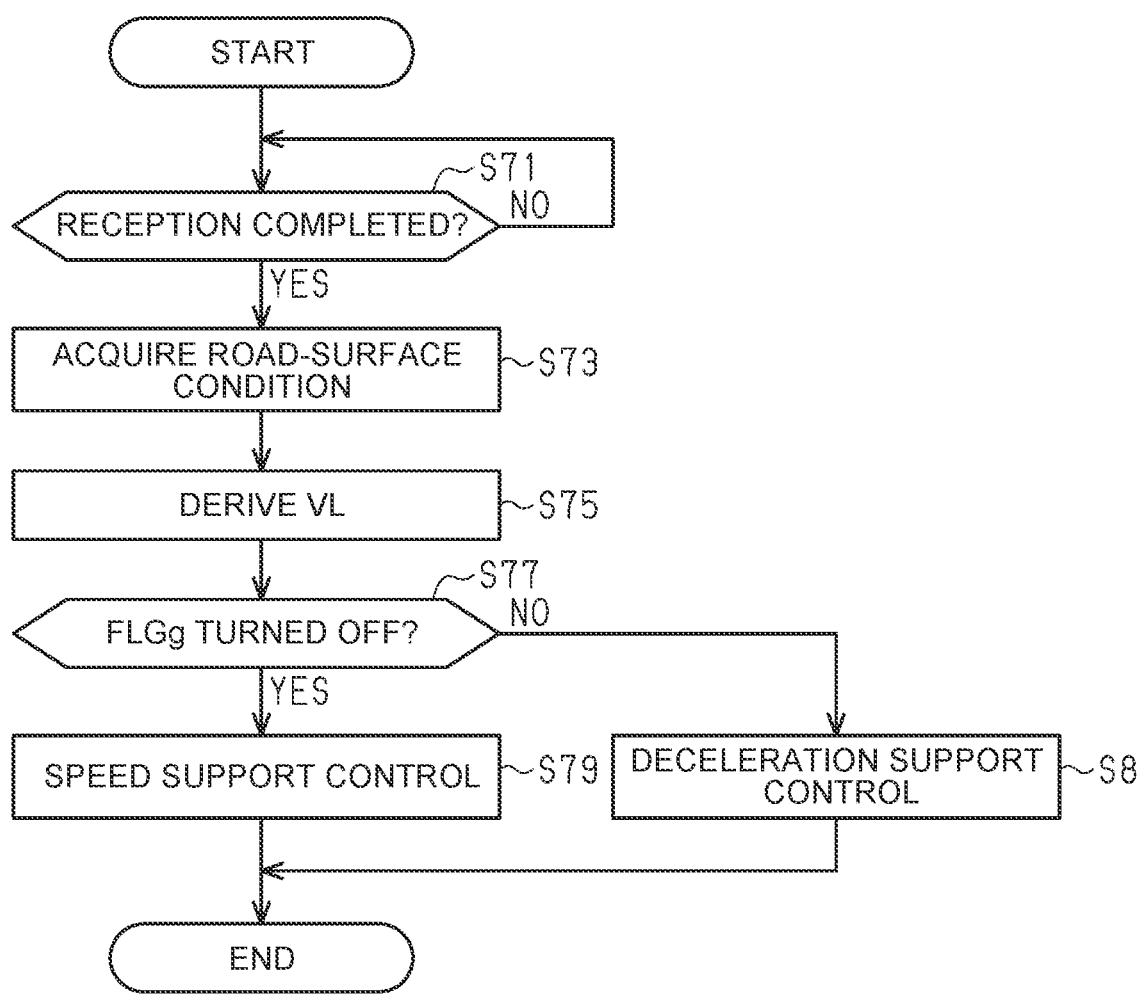

RUNNING SUPPORT SYSTEM FOR VEHICLE AND RUNNING SUPPORT METHOD FOR VEHICLE

CROSS-REFERENCE TO RELATED APPLICATION

This application claims priority to Japanese Patent Application No. 2021-021275 filed on Feb. 12, 2021, incorporated herein by reference in its entirety.

BACKGROUND

1. Technical Field

The present disclosure relates to a running support system for a vehicle and a running support method for a vehicle.

2. Description of Related Art

Japanese Unexamined Patent Application Publication No. 2016-78730 (JP 2016-78730 A) describes an example of a vehicle speed control in automatic running of a vehicle. That is, in a case where a vehicle is caused to run along a curve, an appropriate vehicle speed that is a vehicle speed appropriate for the vehicle to run along the curve is derived based on the curvature of the curve or a curve running history.

SUMMARY

The appropriate vehicle speed can vary depending on the state of the vehicle at the time of running along a curve. Such a problem is not limited to a case where the vehicle runs along a curve and can occur in a case where the vehicle runs along a straight course.

A running support system for a vehicle that is accomplished to solve the above problem is a system for supporting a vehicle operation performed by a driver during vehicle running. The running support system includes an execution device. The execution device is configured to execute processes including: a temperature acquisition process of acquiring a tire temperature that is a temperature of tires of the vehicle; an appropriate value setting process of setting a vehicle speed appropriate value that is an appropriate vehicle speed when the vehicle runs; and a support process of performing at least either notifying the driver of the vehicle speed appropriate value or decelerating the vehicle in a case where a vehicle speed exceeds the vehicle speed appropriate value. In the appropriate value setting process, the execution device derives, as a candidate value for the vehicle speed appropriate value, a value to be smaller as the tire temperature is lower, and the execution device sets the vehicle speed appropriate value based on the candidate value.

As the tire temperature is lower, the grip force of the tires is smaller. As the grip force of the tires is smaller, stability in the vehicle behavior easily decreases. In view of this, in the above configuration, a value to be smaller as the tire temperature is lower is derived as the candidate value for the vehicle speed appropriate value, and the vehicle speed appropriate value is set based on the candidate value. Then, in the support process, the driver is notified of the vehicle speed appropriate value, or the vehicle is decelerated so that the vehicle speed does not exceed the vehicle speed appropriate value.

That is, with the above configuration, a value corresponding to the state of the vehicle can be set as the vehicle speed appropriate value.

In one aspect of the running support system, in the temperature acquisition process, the execution device may acquire, as the tire temperature, a temperature to be higher as a running distance after the vehicle starts moving is longer.

As the running distance of the vehicle is longer, the tire temperature easily increases. In view of this, in the above configuration, a temperature to be higher as the running distance after the vehicle starts moving is longer is set as the tire temperature.

In one aspect of the running support system, the running support system may further include a storage device in which a road where the vehicle runs is stored such that the road is divided into a plurality of running areas. The storage device may include a map in which respective reference vehicle speed appropriate values for respective running areas are stored as references for the vehicle speed appropriate value. The processes to be executed by the execution device may include a specifying process of specifying a currently-running area from among the running areas, the currently-running area being a running area where the vehicle is running. In the appropriate value setting process, the execution device may derive the candidate value based on the tire temperature and a reference vehicle speed appropriate value corresponding to the currently-running area, the reference vehicle speed appropriate value being acquired from the map.

In the above configuration, an area where the vehicle is running is specified as the currently-running area from among the running areas. Then, the candidate value for the vehicle speed appropriate value is derived based on the tire temperature and a reference vehicle speed appropriate value corresponding to a running area specified as the currently-running area. Hereby, a value in consideration of the currently-running area can be set as the vehicle speed appropriate value.

In one aspect of the running support system, the processes to be executed by the execution device may include a road-surface condition acquisition process of acquiring a road surface μ as a road-surface condition that is a condition of a road surface on which the vehicle is running. In the appropriate value setting process, in a case where the road surface μ is low, the execution device sets, as the vehicle speed appropriate value, a value smaller than a value to be set in a case where the road surface μ is high.

When a μ-value of the road surface where the vehicle is running is low, it is hard for the tires to grip the road surface. In a case where it is hard for the tires to grip the road surface, it is desirable to restrain the vehicle speed to be low, in order to secure the stability in the vehicle behavior. In this regard, in the above configuration, a value corresponding to the road surface μ can be set as the vehicle speed appropriate value. Hereby, in a case where it is hard for the tires to grip the road surface, it is possible to restrain the vehicle speed to be low by executing the support process.

In one aspect of the running support system, in the appropriate value setting process, the execution device may set the vehicle speed appropriate value based on weather information that is information on weather.

At the time when the vehicle runs on a road, the upper limit of the vehicle speed that can secure the stability in the vehicle behavior can change in accordance with weather. For example, in a case where it is raining, it is desirable to restrain the vehicle speed to be lower than that in a case where it is not raining, in order to secure the stability in the vehicle behavior. Also, in a case where the airflow rate is larger, it is desirable to restrain the vehicle speed to be lower than that in a case where the airflow rate is small, in order to secure the stability in the vehicle behavior. In this regard, in the above configuration, it is possible to set a value in consideration of weather as the vehicle speed appropriate value. This makes it possible to perform support corresponding to weather for the driver.

In one aspect of the running support system, a first driving mode and a second driving mode may be prepared in the vehicle as a driving mode selectable by the driver. The first driving mode may be a driving mode in which the vehicle speed is restrained from becoming high as compared to the second driving mode. In the appropriate value setting process, in a case where the first driving mode is selected by the driver, the execution device may set, as the vehicle speed appropriate value, a value smaller than a value to be set in a case where the second driving mode is selected by the driver.

A driver having a high skill for the vehicle operation prefers the vehicle behavior directly changing in response to the vehicle operation performed by the driver. Accordingly, there is such a case that the driver does not desire the support process. In the meantime, in a case where a driver having a low skill for the vehicle operation performs the vehicle operation, it is desirable to restrain the vehicle speed to be low in comparison with a case where the driver having a high skill for the vehicle operation performs the vehicle operation. In the above configuration, the driver can select a driving mode corresponding to the skill of the driver for the vehicle operation. A value corresponding to the driving mode thus selected by the driver can be set as the vehicle speed appropriate value. Hereby, by executing the support process, support corresponding to the driving mode selected by the driver can be performed for the driver.

In one aspect of the running support system, the support process may include a turning preparation control by which the driver is requested to decelerate the vehicle in preparation for entrance of the vehicle into a curve. In the support process, in a case where the first driving mode is selected by the driver, the turning preparation control may be started much before the curve in comparison with a case where the second driving mode is selected by the driver.

In a case where the vehicle is decelerated, the stability in the vehicle behavior easily decreases as the deceleration speed is larger. On this account, in a case where a driver having a low skill for the vehicle operation performs the vehicle operation, it is desirable to restrain the deceleration speed of the vehicle from becoming large in comparison with a case where a driver having a high skill for the vehicle operation performs the vehicle operation.

Further, in a case where the vehicle is decelerated in preparation for entrance of the vehicle into a curve, when the distance from the start position of the deceleration to the start position of the curve is short, the deceleration speed of the vehicle easily becomes large. In the meantime, when the distance is long, the deceleration speed of the vehicle does not easily become large. That is, in a case where a driver having a low skill for the vehicle operation performs the vehicle operation, it is desirable to notify the driver of the start of deceleration of the vehicle much before the curve in comparison with a case where a driver having a high skill for the vehicle operation performs the vehicle operation.

A driver who selects the first driving mode is referred to as a first driver, and a driver who selects the second driving mode is referred to as a second driver. A driver having a high skill for the vehicle operation tends to select the second driving mode in comparison with a driver having a low driving skill. On that account, the first driver is more likely to have a lower skill for the vehicle operation than that of the second driver. In the above configuration, in a case where the first driver performs the vehicle operation, the turning preparation control is started much before the curve in comparison with a case where the second driver performs the vehicle operation. Hereby, in a case where the first driver performs the vehicle operation, it is possible to restrain the deceleration speed of the vehicle from increasing at a stage before the vehicle enters the curve in comparison with a case where the second driver performs the vehicle operation.

In one aspect of the running support system, the support process may include a deceleration support control by which deceleration of the vehicle is controlled in preparation for entrance of the vehicle into a curve. The processes to be executed by the execution device may include a deceleration-speed requested value setting process of setting a deceleration-speed requested value that is a requested value for a deceleration speed of the vehicle. In the deceleration support control, the deceleration of the vehicle may be controlled based on the deceleration-speed requested value. In the deceleration-speed requested value setting process, in a case where the first driving mode is selected by the driver, the execution device may set, as the deceleration-speed requested value, a value smaller than a value to be set in a case where the second driving mode is selected by the driver.

In a case where the vehicle is decelerated, the stability in the vehicle behavior easily decreases as the deceleration speed is larger. In this regard, in the above configuration, in a case where the first driving mode is selected by the driver, a value smaller than a value to be set in a case where the second driving mode is selected by the driver is set as the deceleration-speed requested value. Then, at a stage before the vehicle enters the curve, the deceleration speed of the vehicle is controlled based on the deceleration-speed requested value. Hereby, in a case where the first driver performs the vehicle operation, it is possible to restrain the deceleration speed of the vehicle from becoming large at a stage before the vehicle enters the curve in comparison with a case where the second driver performs the vehicle operation.

In one aspect of the running support system, the execution device may include a first execution device provided outside the vehicle, and a second execution device provided in the vehicle. The first execution device and the second execution device may transmit and receive information to and from each other. The second execution device may execute some processes including the support process from among the processes, and the first execution device may execute remaining processes of the processes.

In the above configuration, the processes are executed by the first execution device and the second execution device in a divided manner. On this account, in comparison with a case where the processes are executed by one execution device, it is possible to reduce loads to the execution devices.

A running support method for a vehicle that is accomplished to solve the above problem is a method for supporting a vehicle operation performed by a driver during vehicle running. The running support method includes: a temperature acquisition process of acquiring a tire temperature that is a temperature of tires of the vehicle; an appropriate value setting process of setting a vehicle speed appropriate value that is an appropriate vehicle speed when the vehicle runs; and a support process of at least either notifying the driver of the vehicle speed appropriate value set in the appropriate value setting process or decelerating the vehicle in a case where a vehicle speed of the vehicle exceeds the vehicle speed appropriate value. The support process is executed by an execution device provided in the vehicle. Further, in the appropriate value setting process, a value to be smaller as the tire temperature acquired in the temperature acquisition process is lower is derived as a candidate value for the vehicle speed appropriate value, and the vehicle speed appropriate value is set based on the candidate value.

By executing the above processes, it is possible to achieve effects equivalent to the effects of the running support system.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 8 is a table illustrating a relationship between a driving mode and each of a mode correction coefficient, a deceleration distance, and a deceleration-speed requested value, the relationship being used in a running support system of a second embodiment;

FIG. 9 is a flowchart to describe part of a processing routine to be executed by a CPU of a server in the running support system;

FIG. 10 is a flowchart to describe a processing routine to be executed by a CPU of a vehicle control device in the running support system;

DETAILED DESCRIPTION OF EMBODIMENTS

First Embodiment

The following describes a first embodiment of a running support system for a vehicle and a running support method for a vehicle with reference to FIGS. 1 to 7.

Overall Configuration

Figure 1:
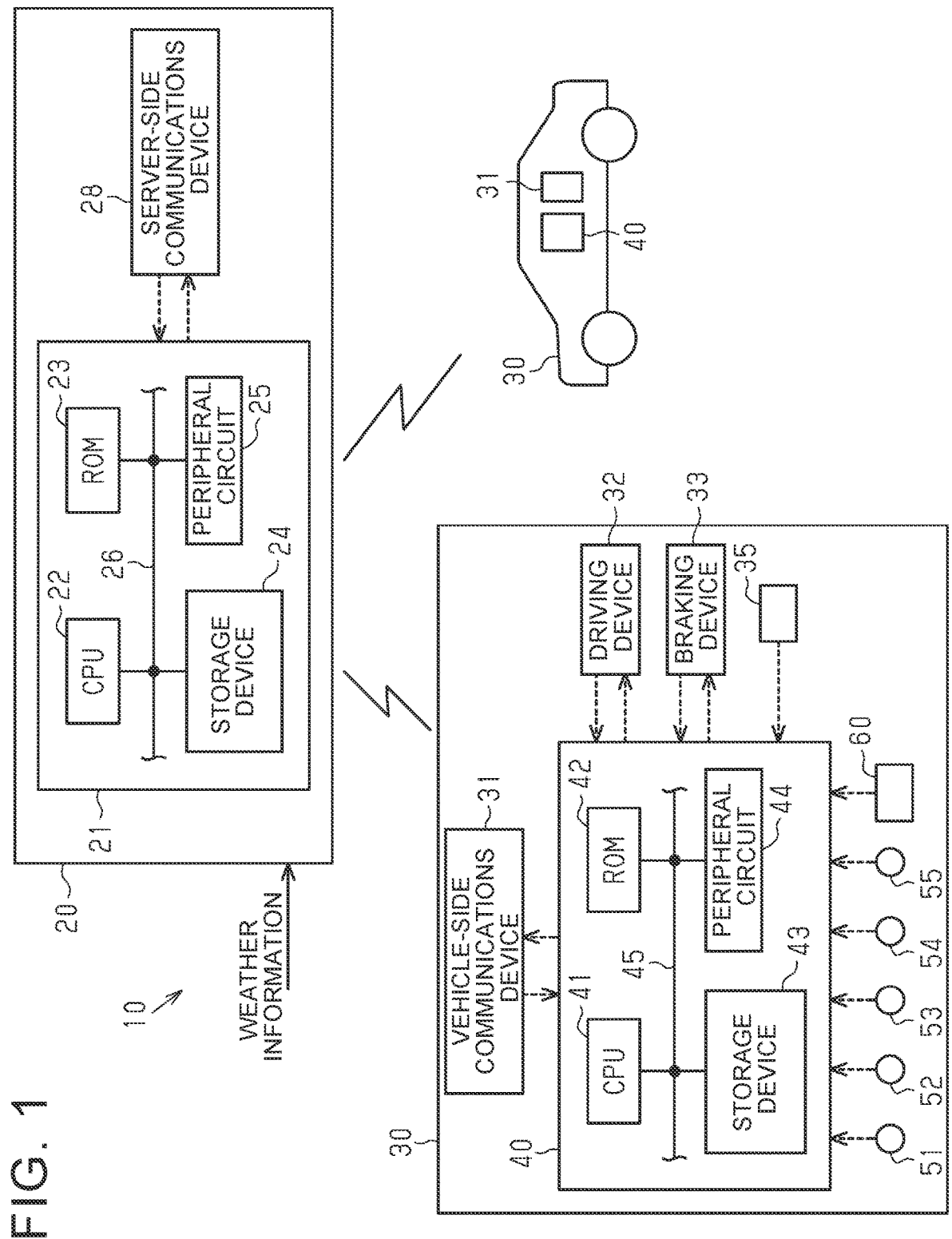
FIG. 1 is a configuration diagram illustrating an outline of a running support system according to a first embodiment.

As illustrated in FIG. 1, a running support system 10 includes a server control device 21 of a server 20 provided outside a vehicle, and a vehicle control device 40 provided in a vehicle 30. The server 20 can transmit and receive various pieces of information to and from the vehicle control device 40 of the vehicle 30 running along a course 101 in a circuit field 100 illustrated in FIG. 2. That is, in a case where a plurality of vehicles 30 is running along the course 101, the server 20 transmits and receives various pieces of information to and from respective vehicle control devices 40 of the vehicles 30.

Configuration of Vehicle 30

As illustrated in FIG. 1, the vehicle 30 includes a vehicle-side communications device 31, a driving device 32, and a braking device 33 in addition to the vehicle control device 40. The driving device 32 adjusts driving force of the vehicle 30. The braking device 33 adjusts braking force of the vehicle 30.

The vehicle-side communications device 31 transmits information output from the vehicle control device 40 to the server 20. Further, the vehicle-side communications device 31 receives information transmitted from the server 20 and outputs the information to the vehicle control device 40.

The vehicle control device 40 includes a CPU 41, a ROM 42, a storage device 43 as an electrically rewritable non-volatile memory, and a peripheral circuit 44. The CPU 41, the ROM 42, the storage device 43, and the peripheral circuit 44 are communicable with each other via a local network 45. The CPU 41 can transmit and receive various pieces of information to and from the server control device 21 via the vehicle-side communications device 31. In the ROM 42, a control program to be executed by the CPU 41 is stored. In the storage device 43, various maps, tables, and so on are stored. The peripheral circuit 44 includes a circuit configured to generate a clock signal defining an inside operation, a power circuit, a reset circuit, and so on.

The vehicle 30 includes a mode operating portion 35 to be operated by a driver. The mode operating portion 35 is an operating portion for the driver to select a driving mode MD of the vehicle 30. In the present embodiment, a plurality of driving modes MD is prepared. That is, the driver can select one driving mode from the driving modes MD by operating the mode operating portion 35.

For example, three driving modes are prepared as the driving modes MD. Among the three driving modes, a first driving mode MD1 is a driving mode for a beginner, a second driving mode MD2 is a driving mode for an intermediate-level driver, and a third driving mode MD3 is a driving mode for an advanced driver. The first driving mode MD1 is a driving mode in which a vehicle speed that is a traveling speed of the vehicle 30 is restrained from becoming large as compared to the second driving mode MD2. Further, the second driving mode MD2 is a driving mode in which the vehicle speed is restrained from becoming large as compared to the third driving mode MD3. The beginner, the intermediate-level driver, and the advanced driver as used herein are vehicle operation levels at the time when the vehicle 30 runs along the course 101 illustrated in FIG. 2.

The vehicle 30 includes various sensors configured to output a detection signal to the vehicle control device 40. The sensors can include, for example, a vehicle speed sensor 51, a front-rear acceleration sensor 52, a lateral acceleration sensor 53, a yaw rate sensor 54, and a steering angle sensor 55. The vehicle speed sensor 51 detects a vehicle speed V and outputs a detection signal corresponding to a detection result. The front-rear acceleration sensor 52 detects a front-rear acceleration Gx of the vehicle 30 and outputs a detection signal corresponding to a detection result. The lateral acceleration sensor 53 detects a lateral acceleration Gy of the vehicle 30 and outputs a detection signal corresponding to a detection result. The yaw rate sensor 54 detects a yaw rate Yr of the vehicle 30 and outputs a detection signal corresponding to a detection result. The steering angle sensor 55 detects a steering angle Str of a steering wheel of the vehicle 30 and outputs a detection signal corresponding to a detection result.

The vehicle 30 includes a GPS receiver 60. The GPS receiver 60 receives, from a GPS satellite, a GPS signal that is a signal on a current position coordinate CP of the vehicle 30 and outputs the GPS signal to the vehicle control device 40. The vehicle control device 40 acquires the current position coordinate CP of the vehicle 30 based on the GPS signal and transmits position information that is information on the position coordinate CP to the server 20 via the vehicle-side communications device 31.

Figure 2:
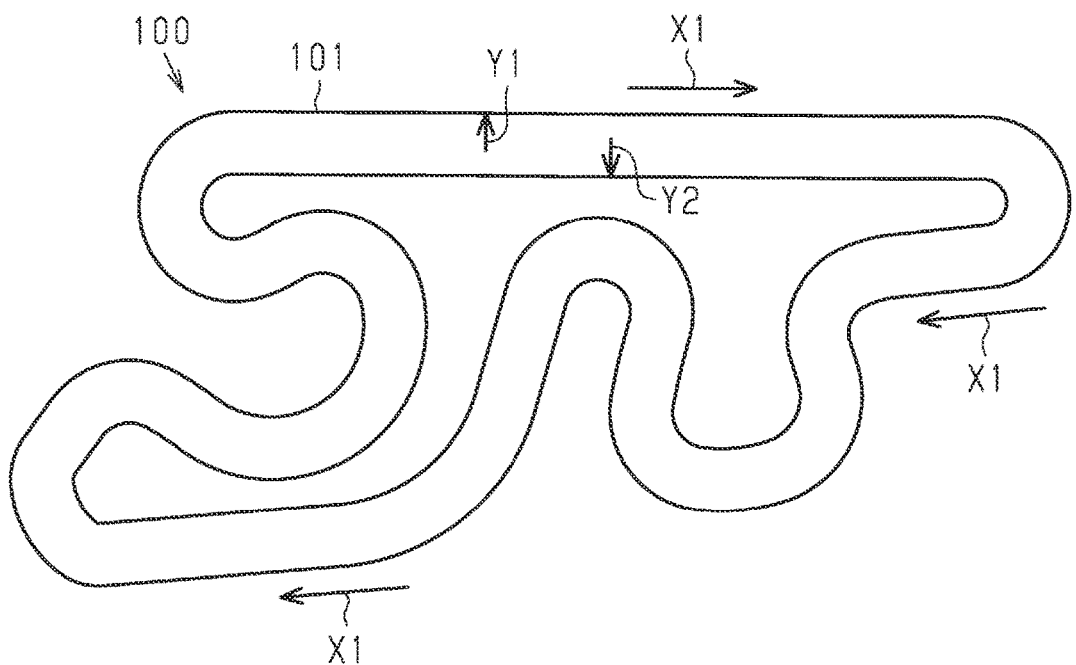
FIG. 2 is a view illustrating a course in a circuit field managed by a server of the running support system.

In the present embodiment, the vehicle control device 40 supports a vehicle operation performed by a driver based on a vehicle speed appropriate value VL in a case where the vehicle 30 is running along the course 101 illustrated in FIG. 2. For example, the vehicle control device 40 notifies the driver of the vehicle speed appropriate value VL, or in a case where the vehicle speed V exceeds the vehicle speed appropriate value VL, the vehicle control device 40 decelerates the vehicle 30. The vehicle speed appropriate value VL is an appropriate vehicle speed at the time when the vehicle 30 runs along the course 101. As will be described later in detail, the vehicle speed appropriate value VL is changed appropriately. Further, the vehicle operation includes at least steering among steering, an accelerator operation, and a brakes operation.

Configuration of Server 20

As illustrated in FIG. 1, the server 20 includes a server-side communications device 28 in addition to the server control device 21. The server-side communications device 28 transmits information output from the server control device 21 to the vehicle 30. Further, the server-side communications device 28 receives information transmitted from the vehicle 30 and outputs the information to the server control device 21.

The server control device 21 includes a CPU 22, a ROM 23, a storage device 24 as an electrically rewritable non-volatile memory, and a peripheral circuit 25. The CPU 22, the ROM 23, the storage device 24, and the peripheral circuit 25 are communicable with each other via a local network 26. The CPU 22 can transmit and receive various pieces of information to and from the vehicle control device 40 via the server-side communications device 28. In the ROM 23, a control program to be executed by the CPU 22 is stored. In the storage device 24, various pieces of information necessary to set the vehicle speed appropriate value VL are stored. The peripheral circuit includes a circuit configured to generate a clock signal defining an inside operation, a power circuit, a reset circuit, and so on.

Figure 3:
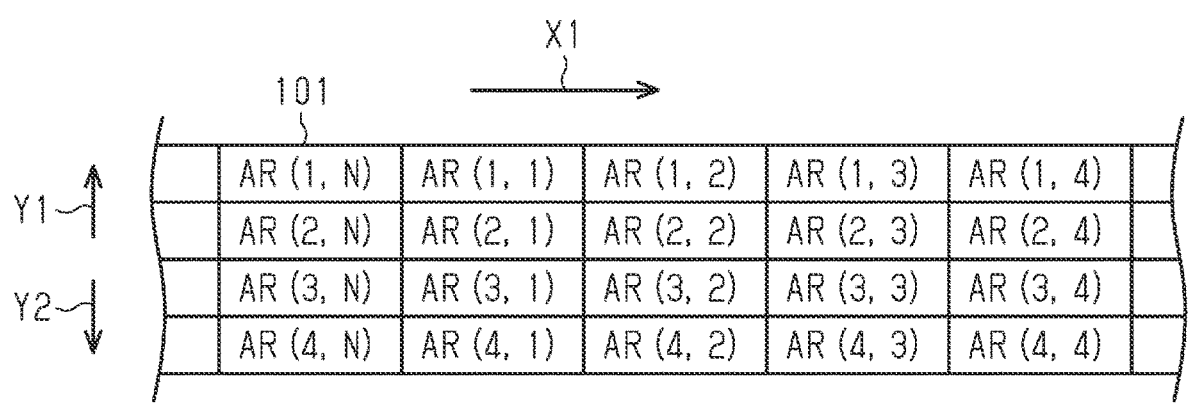
FIG. 3 is a schematic view illustrating some of whole running areas.

In the storage device 24, the course 101 illustrated in FIG. 2 is stored such that the course 101 is divided into a plurality of running areas AR. In FIG. 3, some parts of the course 101 are schematically illustrated. As illustrated in FIG. 3, the running areas AR(1,1), . . . , (1,N), (2,1), . . . , (2,N), (3,1), . . . , (3,N), (4,1), . . . , (4,N), are stored in the storage device 24. Note that "N" is the number of divisions of the course 101 in an advancing direction X1 of the vehicle 30. In the present embodiment, an integer of "5" or more is set as "N."

In the present embodiment, a plurality of running areas AR is set at the same position in the advancing direction X1. For example, four running areas AR(1,1), AR(2,1), AR(3,1), AR(4,1) are placed at the same position in the advancing direction X1. Among the running areas AR(1,1), AR(2,1), AR(3,1), AR(4,1), the running area AR(1,1) is placed at a position closest to an outer side Y1, and the running area AR(2,1) is placed at a position second closest to the outer side Y1. Further, the running area AR(3,1) is placed at a position third closest to the outer side Y1, and the running area AR(4,1) is placed at a position closest to an inner side Y2. Further, the running area AR(1,2) is placed ahead of the running area AR(1,1) in the advancing direction X1, and the running area AR(2,2) is placed ahead of the running area AR(2,1) in the advancing direction X1.

Figure 4:
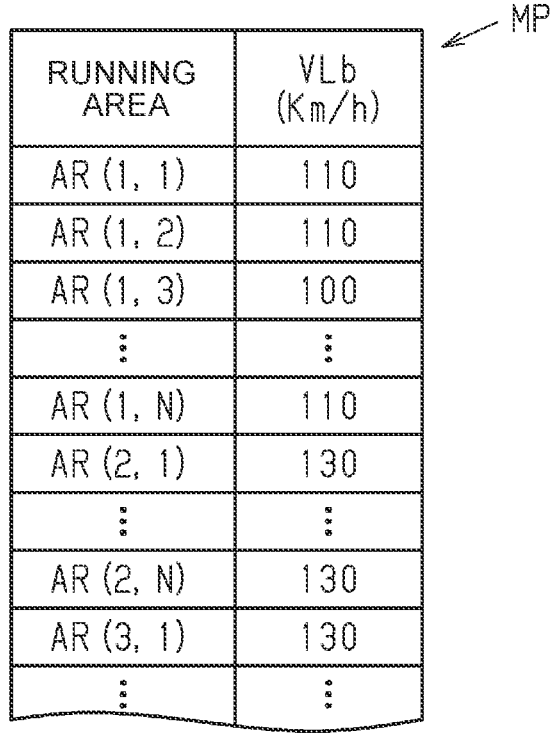
FIG. 4 is a map illustrating respective reference vehicle speed appropriate values of the running areas.

Further, as illustrated in FIG. 4, the storage device 24 includes a map MP in which respective reference vehicle speed appropriate values VLb for the running areas AR are stored as references for the vehicle speed appropriate value VL. As illustrated in FIG. 4, for example, "110 km/h" is set as the reference vehicle speed appropriate value VLb for the running area AR(1,1). Further, "110 km/h" is set as the reference vehicle speed appropriate value VLb for the running area AR(1,2). Further, "100 km/h" is set as the reference vehicle speed appropriate value VLb for the running area AR(1,3). Further, "130 km/h" is set as the reference vehicle speed appropriate value VLb for the running area AR(2,1). Further, "130 km/h" is set as the reference vehicle speed appropriate value VLb for the running area AR(3,1).

Figure 5:
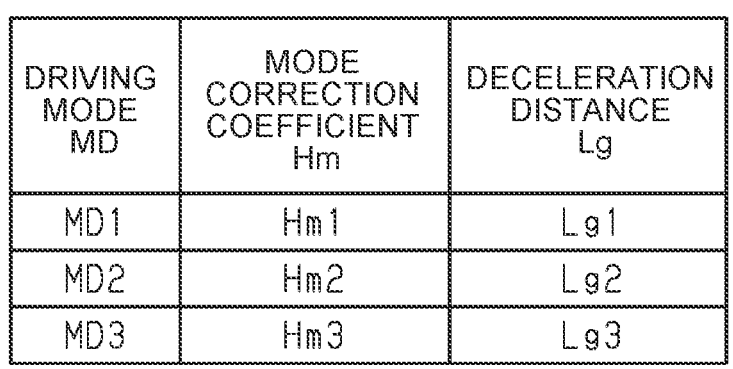
FIG. 5 is a table illustrating a relationship between a driving mode and each of a mode correction coefficient and a deceleration distance.

Further, as illustrated in FIG. 5, the storage device 24 includes a table TL to set a mode correction coefficient Hm and a deceleration distance Lg in accordance with the driving mode MD. The mode correction coefficient Hm is a correction coefficient to be used to derive the vehicle speed appropriate value VL. The mode correction coefficient Hm is used to derive a value corresponding to the driving mode MID selected by the driver as the vehicle speed appropriate value VL. The deceleration distance Lg is a parameter to be used to support deceleration of the vehicle 30 before a curve in the course 101. That is, in a case where the vehicle 30 is approaching a curve and the distance from the vehicle 30 to the start position of the curve becomes the deceleration distance Lg or less, it is preferable that the vehicle 30 be decelerated. In the present embodiment, an area from the start position of the curve to a position before the start position only by the deceleration distance Lg is also referred to as a "deceleration area."

As illustrated in FIG. 5, a first mode correction coefficient Hm1 is set as the mode correction coefficient Hm for the first driving mode MD1. For example, the first mode correction coefficient Hm1 should be set to "1." A first deceleration distance Lg1 is set as the deceleration distance Lg for the first driving mode MD1.

A second mode correction coefficient Hm2 larger than the first mode correction coefficient Hm1 is set as the mode correction coefficient Hm for the second driving mode MD2. A second deceleration distance Lg2 is set as the deceleration distance Lg for the second driving mode MD2. The second deceleration distance Lg2 is shorter than the first deceleration distance Lg1.

A third mode correction coefficient Hm3 larger than the second mode correction coefficient Hm2 is set as the mode correction coefficient Hm for the third driving mode MD3. A third deceleration distance Lg3 is set as the deceleration distance Lg for the third driving mode MD3. The third deceleration distance Lg3 is shorter than the second deceleration distance Lg2.

As illustrated in FIG. 1, the server 20 acquires weather information that is information on the weather in the circuit field 100. On this account, the server control device 21 can grasp the weather in the circuit field 100. For example, the server control device 21 can grasp whether it is raining in the circuit field 100 or not. Further, in a case where it is raining in the circuit field 100, the server control device 21 can grasp the amount of precipitation. Further, the server control device 21 can grasp the direction of wind in the circuit field 100 and the airflow rate of the wind.

Procedure of Process to Support Vehicle Operation Performed by Driver when Vehicle 30 Runs Along Course 101

In a case where the vehicle 30 is running along the course 101, the vehicle control device 40 sequentially transmits position information on the current position coordinate CP of the vehicle 30 to the server 20 via the vehicle-side communications device 31. Then, the server control device 21 of the server 20 sets a vehicle speed appropriate value VLa based on the position coordinate CP of the vehicle 30 and transmits the vehicle speed appropriate value VLa to the vehicle 30.

Figure 6:
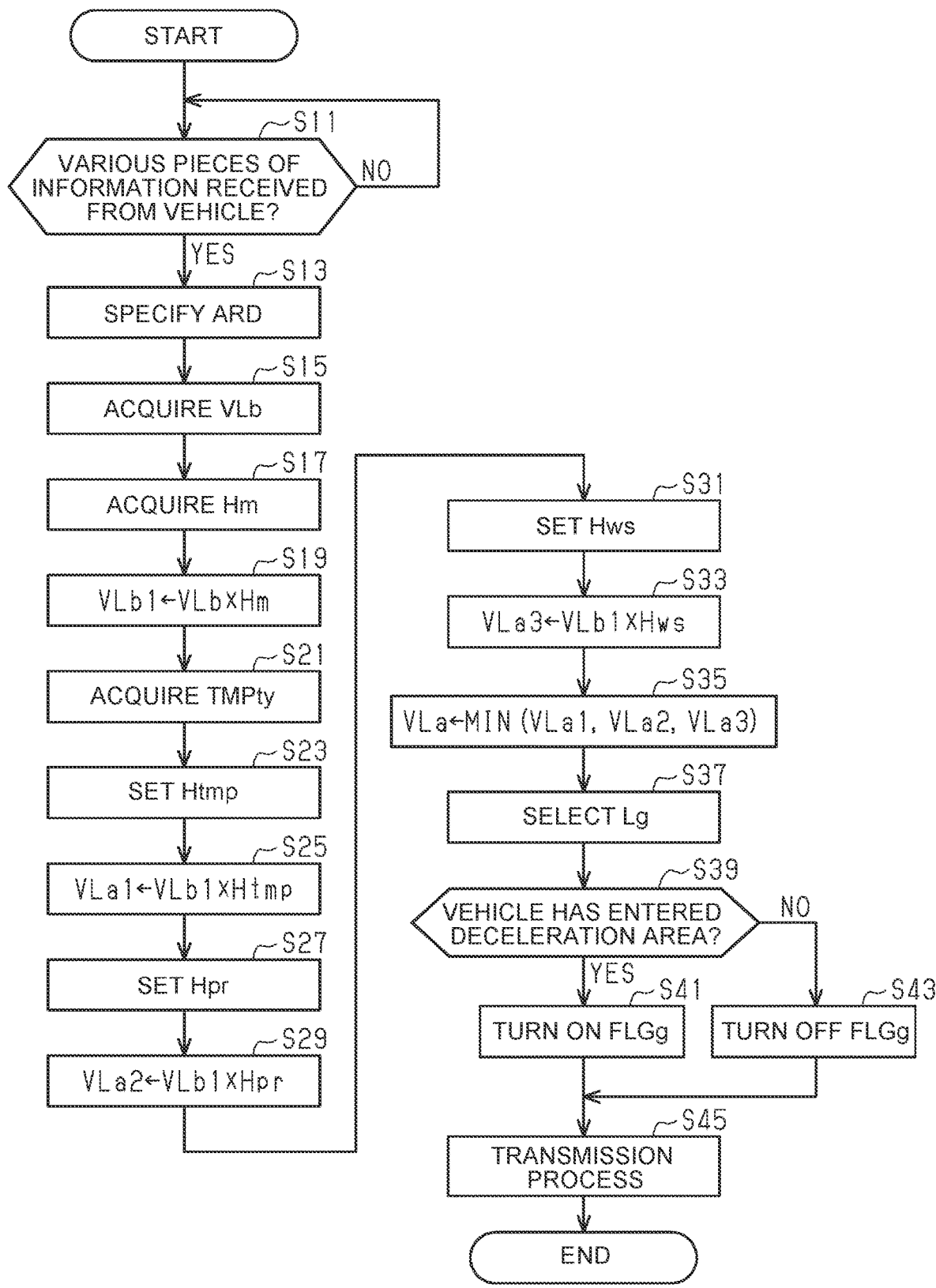
FIG. 6 is a flowchart to describe a processing routine to be executed by a CPU of the server.

FIG. 6 illustrates a processing routine to be executed by the CPU 22 of the server control device 21. The CPU 22 repeatedly executes this processing routine.

In this processing routine, first, in step S11, the CPU 22 determines whether the CPU 22 has received various pieces of information from the vehicle 30. The various pieces of information as used herein are information necessary to derive the vehicle speed appropriate value VL and the deceleration distance Lg. For example, the CPU 22 determines whether the CPU 22 has received the current position coordinate CP of the vehicle 30 and the driving mode MD selected by the driver. In a case where the CPU 22 has not received the various pieces of information (S11: NO), the CPU 22 repeatedly executes the determination of step S11 until the CPU 22 has received the various pieces of information. In the meantime, in a case where the CPU 22 has received the various pieces of information (S11: YES), the CPU 22 advances the process to step S13.

In step S13, the CPU 22 specifies a currently-running area ARD as a running area where the vehicle 30 is running at present from among all the running areas AR, based on the acquired position coordinate CP. For example, the CPU 22 selects a running area AR including the acquired position coordinate CP as the currently-running area ARD. Subsequently, in step S15, the CPU 22 acquires a reference vehicle speed appropriate value VLb based on the currently-running area ARD. That is, the CPU 22 acquires the reference vehicle speed appropriate value VLb for the running area AR specified as the currently-running area ARD from the map MP in the storage device 24.

In subsequent step S17, the CPU 22 acquires, from the table TL illustrated in FIG. 5, a mode correction coefficient Hm corresponding to the driving mode MID selected by the driver. Then, in step S19, the CPU 22 derives the product of the reference vehicle speed appropriate value VLb and the mode correction coefficient Hm as a corrected reference vehicle speed appropriate value VLb1. A corrected reference vehicle speed appropriate value VLb1 to be obtained in a case where the first driving mode MD1 is selected by the driver is smaller than a corrected reference vehicle speed appropriate value VLb1 to be obtained in a case where the second driving mode MD2 is selected by the driver. The corrected reference vehicle speed appropriate value VLb1 to be obtained in a case where the second driving mode MD2 is selected by the driver is smaller than a corrected reference vehicle speed appropriate value VLb1 to be obtained in a case where the third driving mode MD3 is selected by the driver.

Subsequently, in step S21, the CPU 22 acquires a tire temperature TMPty that is the temperature of tires of the vehicle 30. For example, the CPU 22 acquires, as the tire temperature TMPty, an estimated value of the temperature of the tires based on the number of laps of the vehicle 30 along the course 101. As the running distance of the vehicle 30 after the vehicle 30 starts moving on the course 101 is longer, the temperature of the tires can be expected to be higher. When the number of laps of the vehicle 30 along the course 101 increases, the running distance of the vehicle 30 gets longer. In view of this, the CPU 22 acquires, as the tire temperature TMPty, a value to be larger as the number of laps is lager. Hereby, the CPU 22 can acquire, as the tire temperature TMPty, a temperature to be higher as the running distance of the vehicle 30 after the vehicle 30 starts moving on the course 101 is longer. Note that, in a case where the number of laps is "1," the CPU 22 should acquire an outside temperature or a temperature corresponding to the outside temperature as the tire temperature TMPty, for example.

Subsequently, in step S23, the CPU 22 sets a tire temperature correction coefficient Htmp based on the tire temperature TMPty. The tire temperature correction coefficient Htmp is a correction coefficient to set a value corresponding to the tire temperature TMPty as the vehicle speed appropriate value VL. For example, the CPU 22 sets, as the tire temperature correction coefficient Htmp, a value to be smaller as the tire temperature TMPty is lower. Then, in step S25, the CPU 22 derives, as a first vehicle speed candidate value VLa1, the product of the corrected reference vehicle speed appropriate value VLb1 and the tire temperature correction coefficient Htmp. Hereby, as the first vehicle speed candidate value VLa1, a value to be as the tire temperature TMPty is lower as the tire temperature TMPty is lower is set.

Subsequently, in step S27, the CPU 22 sets a precipitation correction coefficient Hpr based on received weather information. The precipitation correction coefficient Hpr is a correction coefficient to set a value corresponding to the weather in the circuit field 100 as the vehicle speed appropriate value VL. More specifically, the precipitation correction coefficient Hpr is a correction coefficient to set a value corresponding to the amount of precipitation in the circuit field 100 as the vehicle speed appropriate value VL. For example, in a case where it is raining in the circuit field 100, the CPU 22 sets, as the precipitation correction coefficient Hpr, a value smaller than a value to be set in a case where it is not raining. Further, for example, in a case where it is raining in the circuit field 100, the CPU 22 sets, as the precipitation correction coefficient Hpr, a value to be smaller as the amount of precipitation is larger. Then, in step S29, the CPU 22 derives, as a second vehicle speed candidate value VLa2, the product of the corrected reference vehicle speed appropriate value VLb1 and the precipitation correction coefficient Hpr. Hereby, in a case where it is raining in the circuit field 100, a value smaller than a value to be set in a case where it is not raining is set as the second vehicle speed appropriate value VLa2. Further, in a case where it is raining in the circuit field 100, a value to be smaller as the amount of precipitate is larger is set as the second vehicle speed candidate value VLa2.

In subsequent step S31, the CPU 22 sets an airflow rate correction coefficient Hws based on the received weather information. The airflow rate correction coefficient Hws is a correction coefficient to set a value corresponding to the weather in the circuit field 100 as the vehicle speed appropriate value VL. More specifically, the airflow rate correction coefficient Hws is a correction coefficient to set a value corresponding to the airflow rate in the circuit field 100 as the vehicle speed appropriate value VL. For example, the CPU 22 sets, as the airflow rate correction coefficient Hws, a value to be smaller as the airflow rate is larger. Then, in step S33, the CPU 22 derives, as a third vehicle speed candidate value VLa3, the product of the corrected reference vehicle speed appropriate value VLb1 and the airflow rate correction coefficient Hws. Hereby, a value to be smaller as the airflow rate is larger is set as the third vehicle speed candidate value VLa3.

Subsequently, in step S35, the CPU 22 derives a vehicle speed appropriate value VLa based on the first vehicle speed candidate value VLa1, the second vehicle speed candidate value VLa2, and the third vehicle speed candidate value VLa3. For example, the CPU 22 derives, as the vehicle speed appropriate value VLa, a smallest value among the first vehicle speed candidate value VLa1, the second vehicle speed candidate value VLa2, and the third vehicle speed candidate value VLa3. For example, in a case where the first vehicle speed candidate value VLa1 is the smallest among three vehicle speed candidate values VLa1, VLa2, VLa3, a value to be smaller as the tire temperature TMPty is lower is set as the vehicle speed appropriate value VLa. Further, for example, in a case where the second vehicle speed candidate value VLa2 is the smallest among the three vehicle speed candidate values VLa1, VLa2, VLa3, a value to be smaller as the amount of precipitate is larger is set as the vehicle speed appropriate value VLa. Further, for example, in a case where the third vehicle speed candidate value VLa3 is the smallest among the three vehicle speed candidate values VLa1, VLa2, VLa3, a value to be smaller as the airflow rate is larger is set as the vehicle speed appropriate value VLa.

In subsequent step S37, the CPU 22 acquires, from the table TL illustrated in FIG. 5, a deceleration distance Lg corresponding to the driving mode MD selected by the driver. Then, in step S39, the CPU 22 determines whether or not the vehicle 30 has entered the deceleration area, based on the currently-running area ARD and the deceleration distance Lg. In a case where the vehicle 30 has entered the deceleration area, it is desirable to decelerate the vehicle 30 in preparation for entrance of the vehicle 30 into a curve. As described above, an area from the start position of the curve to a position before the start position only by the deceleration distance Lg is set as the deceleration area. The deceleration distance Lg is a length corresponding to the driving mode MD selected by the driver. Accordingly, the dimension of the deceleration area in the advancing direction X1 varies depending on the driving mode MD selected by the driver. In a case where the currently-running area ARD is included in the deceleration area, the vehicle 30 is considered to enter the deceleration area. In the meantime, in a case where the currently-running area ARD is not included in the deceleration area, the vehicle 30 is considered not to enter the deceleration area.

In a case where the CPU 22 determines that the vehicle 30 has entered the deceleration area (S39: YES), the CPU 22 advances the process to step S41. In step S41, the CPU 22 turns on a deceleration flag FLGg. Then, the CPU 22 advances the process to step S45.

In the meantime, in step S39, in a case where the CPU 22 determines that the vehicle 30 has not entered the deceleration area (S39: NO), the CPU 22 advances the process to step S43. In step S43, the CPU 22 turns off the deceleration flag FLGg. Then, the CPU 22 advances the process to step S45.

In step S45, the CPU 22 executes a transmission process of transmitting the vehicle speed appropriate value VLa and the deceleration flag FLGg from the server-side communications device 28 to the vehicle 30. After that, the CPU 22 ends this processing routine once.

When the CPU 41 of the vehicle control device 40 receives the vehicle speed appropriate value VLa from the server 20, the CPU 41 determines a vehicle speed appropriate value VL. Then, the CPU 41 supports the vehicle operation performed by the driver based on the vehicle speed appropriate value VL and the deceleration flag FLGg.

Figure 7:
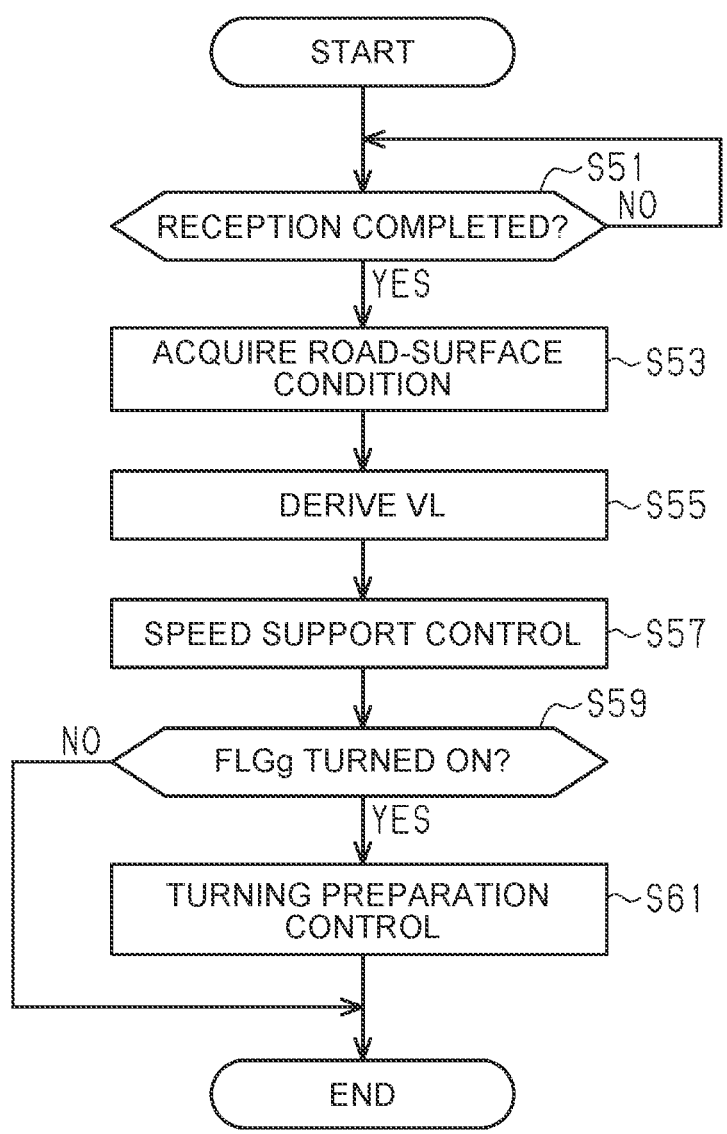
FIG. 7 is a flowchart to describe a processing routine to be executed by a CPU of a vehicle control device in the running support system.

FIG. 7 illustrates a processing routine to be executed by the CPU 41 of the vehicle control device 40. The CPU 41 repeatedly executes this processing routine.

In this processing routine, first, in step S51, the CPU 41 determines whether or not the CPU 41 has received the vehicle speed appropriate value VLa and the deceleration flag FLGg. In a case where the CPU 41 has not received the vehicle speed appropriate value VLa and the deceleration flag FLGg (S51: NO), the CPU 41 repeatedly executes the determination of step S51 until the CPU 41 has received them. In the meantime, in a case where the CPU 41 has received the vehicle speed appropriate value VLa and the deceleration flag FLGg (S51: YES), the CPU 41 advances the process to step S53.

In step S53, the CPU 41 acquires a road-surface condition of the currently-running area ARD. In the present embodiment, the CPU 41 acquires an estimated value of a road surface $\mu$ as the road-surface condition. For example, in a case where a driving force is input into wheels of the vehicle 30, the CPU 41 can derive the estimated value of the road surface $\mu$ based on the driving force and a slip amount of the wheels.

Then, in step S55, the CPU 41 derives a vehicle speed appropriate value VL based on the vehicle speed appropriate value VLa and the road-surface condition. For example, the CPU 41 determines whether or not the estimated value of the road surface $\mu$ derived as the road-surface condition is equal to or more than a $\mu$-determination value. The $\mu$-determination value is set as a determination reference based on which it is determined whether the road surface is a low $\mu$-road or not. In a case where the estimated value of the road surface $\mu$ is less than the $\mu$-determination value, the CPU 41 regards the road surface as the low $\mu$-road. In a case where the estimated value of the road surface $\mu$ is equal to or more than the $\mu$-determination value, the CPU 41 does not regard the road surface as the low $\mu$-road. In a case where the estimated value of the road surface $\mu$ is less than the $\mu$-determination value, the CPU 41 sets a positive value as an adjustment value H3. In the meantime, in a case where the estimated value of the road surface $\mu$ is equal to or more than the $\mu$-determination value, the CPU 41 sets "0" as the adjustment value H3. Then, the CPU 41 derives, as the vehicle speed appropriate value VL, a value obtained by subtracting the adjustment value H3 from the vehicle speed appropriate value VLa.

When the CPU 41 has derived the vehicle speed appropriate value VL as such, the CPU 41 executes a support process of supporting a vehicle operation performed by the driver of the vehicle 30 running along the course 101. In the present embodiment, the support process includes a speed support control and a turning preparation control.

That is, in step S57, the CPU 41 executes the speed support control. In the present embodiment, the CPU 41 notifies the driver of the vehicle speed appropriate value VL. Further, in a case where the vehicle speed V exceeds the vehicle speed appropriate value VL, the CPU 41 decelerates the vehicle 30 by controlling at least either one of the driving device 32 and the braking device 33.

In subsequent step S59, the CPU 41 determines whether or not the deceleration flag FLGg received from the server 20 is turned on. In a case where the deceleration flag FLGg is turned on (S59: YES), the CPU 41 advances the process to step S61. In the meantime, in a case where the deceleration flag FLGg is turned off (S59: NO), the CPU 41 ends this processing routine once.

In step S61, the CPU 41 executes the turning preparation control such that the CPU 41 requests the driver to decelerate the vehicle 30. For example, the CPU 41 requests the driver to perform a brakes operation. That is, in a case where the vehicle 30 is determined to have entered the deceleration area, the CPU 41 requests the driver to perform a vehicle operation to decelerate the vehicle 30. Then, the CPU 41 ends this processing routine once.

Correspondence

The correspondence between what is described in the present embodiment and what is described in the field of SUMMARY is as follows.

Step S21 corresponds to the "temperature acquisition process" of acquiring the tire temperature TMPty that is the temperature of the tires of the vehicle 30. Steps S19, S25, S29, S33, S35, and S55 correspond to the "appropriate value setting process" of setting the vehicle speed appropriate value VL. In the present embodiment, a plurality of vehicle speed candidate values is derived, and the vehicle speed appropriate value VL is set based on the vehicle speed candidate values. Particularly, step S25 corresponds to the process of driving, as the first vehicle speed candidate value VLa1, a value to be smaller as the tire temperature TMPty is lower. Steps S29, S33 correspond to the process of deriving the vehicle speed candidate values VLa2, VLa3 based on weather information. Step S19 corresponds to the process of setting the vehicle speed appropriate value VL based on the driving mode MD selected by the driver. Step S55 corresponds to the process of setting the vehicle speed appropriate value VL based on the road-surface condition.

Steps S57, S61 correspond to the "support process." Particularly, step S57 corresponds to the "speed support control" by which at least either the driver is notified of the vehicle speed appropriate value VL or the vehicle is decelerated in a case where the vehicle speed V exceeds the vehicle speed appropriate value VL. Further, step S61 corresponds to the "turning preparation control" by which the driver is requested to decelerate the vehicle 30 in preparation for entrance of the vehicle 30 into a curve.

Step S13 corresponds to the "specifying process" of specifying the currently-running area ARD from among the running areas AR. Step S53 corresponds to the "road-surface condition acquisition process" of acquiring a road surface μ as the road-surface condition.

The storage device 24 of the server control device 21 corresponds to the "storage device" in which a road where the vehicle 30 runs is stored such that the road is divided into a plurality of running areas AR. Further, the CPU 22 of the server control device 21 and the CPU 41 of the vehicle control device 40 correspond to the "execution device" configured to execute the above processes. Further, the CPU 41 of the vehicle control device 40 corresponds to the "second execution device" configured to execute some processes including the support process from among the above processes, and the CPU 22 of the server control device 21 corresponds to the "first execution device" configured to execute remaining processes of the above processes.

Each of the vehicle speed candidate values VLa1 to VLa3 corresponds to the "candidate value for the vehicle speed appropriate value." Among the vehicle speed candidate values VLa1 to VLa3, the first vehicle speed candidate value VLa1 corresponds to the "candidate value" derived as a value to be smaller as the tire temperature TMPty is lower.

Operations and Effects in First Embodiment (1-1) In a case where the vehicle 30 runs along the course 101 illustrated in FIG. 2, the temperature of the tires is relatively low at the point when the vehicle 30 starts running. As the temperature of the tires is lower, the grip force of the tires is smaller. As the grip force of the tires is smaller, the stability of the vehicle behavior easily decreases. On this account, in a case where the temperature of the tires is low, it is desirable to restrain the vehicle speed V to be low in comparison with a case where the temperature of the tires is high.

In the present embodiment, a value to be smaller as the tire temperature TMPty is lower is derived as the first vehicle speed candidate value VLa1. The vehicle speed appropriate value VL is set based on the first vehicle speed candidate value VLa1. On this account, a value to be smaller as the tire temperature TMPty is lower can be set as the vehicle speed appropriate value VL. That is, even in a case where the vehicle 30 runs along the same course 101, when the tire temperature TMPty changes, the grip force of the tires may also change. On this account, a different value can be set as the vehicle speed appropriate value VL.

Thus, in the present embodiment, a value in consideration of the state of the vehicle 30, more specifically, a value in consideration of the grip force of the tires of the vehicle 30 can be set as the vehicle speed appropriate value VL. Accordingly, it is possible to support the vehicle operation performed by the driver in consideration of the grip force of the tires at that time.

(1-2) In the present embodiment, the tire temperature TMPty is acquired based on the number of laps of the vehicle 30 along the course 101, the number of laps correlating with the running distance of the vehicle 30. Hereby, even in a case where the vehicle 30 is not provided with a sensor configured to detect the temperature of the tires, a value corresponding to the tire temperature TMPty can be set as the vehicle speed appropriate value VL.

(1-3) In a case where the driver drives a vehicle along the course 101 that the driver is not familiar with, it is desirable to restrain the vehicle speed V to be low in order to secure the safety of the vehicle 30. In the meantime, as the driver repeatedly drives the vehicle along the same course 101, the degree of familiarity of the driver with the vehicle operation to drive the vehicle 30 along the course 101 rises. In a case where the degree of familiarity is high as such, the vehicle speed V may not be restrained so much in comparison with a case where the degree of familiarity is not high.

In the present embodiment, a value to be larger as the number of laps of the vehicle 30 running along the course 101 increases can be set as the vehicle speed appropriate value VL. That is, it may be said that a value to be larger as the degree of familiarity of the driver with the vehicle operation to drive the vehicle 30 along the course 101 is higher can be set as the vehicle speed appropriate value VL. Accordingly, in the present embodiment, a value corresponding to the degree of familiarity can be set as the vehicle speed appropriate value VL. Further, it is possible to support the vehicle operation performed by the driver in consideration of the degree of familiarity.

Note that, in this case, the number of laps of the vehicle 30 along the course 101 corresponds to an index indicative of the degree of familiarity of the driver with the vehicle operation to drive the vehicle 30 on a road where the vehicle 30 is running. In this case, a process of measuring the number of laps corresponds to an "index acquisition process" of acquiring the index indicative of the degree of familiarity.

(1-4) In a case where the vehicle 30 runs along the course 101, the currently-running area ARD is specified from among the running areas AR set by dividing the course 101. Then, the vehicle speed appropriate value VL is set based on the reference vehicle speed appropriate value VLb corresponding to the currently-running area ARD. Accordingly, a value corresponding to the area where the vehicle 30 is running can be set as the vehicle speed appropriate value VL. Further, it is possible to support the vehicle operation performed by the driver in consideration of the currently-running area ARD.

(1-5) In a case where the vehicle 30 runs on a road with a small μ-value, the vehicle behavior is easily disturbed. In other words, in order to secure stability in the vehicle behavior, it is preferable to restrain the vehicle speed V to be low in a case where the road surface μ where the vehicle runs is small. In view of this, in the present embodiment, in a case where the road surface μ is small, a value smaller than a value to be set in a case where the road surface μ is not small can be set as the vehicle speed appropriate value VL. Accordingly, it is possible to support the vehicle operation performed by the driver in consideration of the road surface μ.

(1-6) In a case where the weather in the circuit field 100 changes, an appropriate vehicle speed at which the vehicle 30 is to run along the course 101 with the stability in the vehicle behavior being secured can also change. For example, as the amount of precipitation is larger, the field of view of the driver turns worse, so that it is hard for the driver to drive the vehicle 30. Further, for example, as the airflow rate is larger, external force to act on the vehicle 30 becomes larger, and eventually, the stability in the vehicle behavior easily decreases.

In this regard, in the present embodiment, a value corresponding to a determination result on whether it is raining or not or a value corresponding to the airflow rate can be set as the vehicle speed appropriate value VL. That is, a value in consideration of weather can be set as the vehicle speed appropriate value VL. Hereby, it is possible to support the vehicle operation performed by the driver in consideration of weather.

(1-7) In the present embodiment, a value corresponding to the driving mode MD selected by the driver is set as the vehicle speed appropriate value VL. That is, by executing the support process, support corresponding to the driving mode MD selected by the driver can be performed for the driver.

For example, assume a case where a driver who does not have confidence in driving a vehicle along the course 101 selects the first driving mode MD1. In this case, a value small than values to be set in cases where the driving modes MD2, MD3 other than the first driving mode MD1 are selected is set as the vehicle speed appropriate value VL. In a case where the driver performs the vehicle operation in this state, the driver is notified of the vehicle speed appropriate value VL. On this account, when the driver performs the vehicle operation in accordance with the vehicle speed appropriate value VL thus notified, the driver can drive the vehicle 30 along the course 101 safely.

Further, for example, assume a case where a driver who has confidence to some extent in driving a vehicle along the course 101 selects the second driving mode MD2. In this case, a value large than a value to be set in a case where the first driving mode MD1 is selected is set as the vehicle speed appropriate value VL. In a case where the driver performs the vehicle operation in this state, the driver is notified of the vehicle speed appropriate value VL. In this case, in comparison with a case where the first driving mode MD1 is selected, the support process is not executed so actively. On this account, when the driver performs the vehicle operation in accordance with the vehicle speed appropriate value VL thus notified, the drive can enjoy driving the vehicle 30 along the course 101.

(1-8) In a case where the vehicle 30 is decelerated, the stability in the vehicle behavior of the vehicle 30 easily decreases as the deceleration speed is larger. On this account, in a case where the first driving mode MD1 that is a driving mode for a beginner is selected by the driver, it is desirable to support the vehicle operation performed by the driver so that the deceleration speed of the vehicle 30 does not become larger than those in cases where other driving modes are selected.

Further, in a case where the vehicle 30 is decelerated in preparation for entrance of the vehicle 30 into a curve, when the distance from the start position of the deceleration to the start position of the curve is short, the deceleration speed of the vehicle 30 easily increases. In the meantime, when the distance is long, the deceleration speed of the vehicle 30 does not easily increase. That is, in a case where a driver having a low skill for the vehicle operation performs the vehicle operation, it is desirable to notify the driver of the start of deceleration of the vehicle 30 much before the vehicle 30 enters the curve in comparison with a case where a driver having a high skill for the vehicle operation performs the vehicle operation.

In the present embodiment, when the vehicle 30 is determined to have entered the deceleration area, the turning preparation control is executed such that the driver is requested to perform the vehicle operation to decelerate the vehicle 30. In a case where the first driving mode MD1 is selected by the driver, the dimension of the deceleration area in the advancing direction X1 is larger than those in cases where the other driving modes MD2, MD3 are selected. On this account, in a case where the first driving mode MD1 is selected by the driver, the turning preparation control is started much before the curve in comparison with cases where the other driving modes MD2, MD3 are selected. Hereby, in a case where the first driving mode MD1 is selected by the driver, the vehicle 30 is allowed to enter the curve in a state where the vehicle speed is sufficiently lowered without increasing the deceleration speed of the vehicle 30 in comparison with cases where the other driving modes MD2, MD3 are selected.

That is, in the present embodiment, in a case where the vehicle 30 runs in an area before a curve, support corresponding to the driving mode MD selected by the driver can be performed for the driver. (1-9) In the present embodiment, the vehicle speed appropriate value VL is set in collaboration with the server control device 21 and the vehicle control device 40. On this account, in comparison with a case where various processes to set the vehicle speed appropriate value VL are executed by one control device, it is possible to reduce control loads to the control devices 21, 40.

Second Embodiment

The following describes a second embodiment of the running support system and the running support method with reference to FIGS. 8 to 10. In the following description, parts different from the first embodiment will be mainly described. The same constituent as or a constituent equivalent to a constituent described in the first embodiment has the same reference sign as the constituent described in the first embodiment, and redundant descriptions about the constituent will be omitted.

Configuration of Server 20

The storage device 24 of the server control device 21 includes a table TL1 illustrated in FIG. 8. As illustrated in FIG. 8, the table TL1 is used to set the mode correction coefficient Hm, the deceleration distance Lg, and a deceleration-speed requested value DecR in accordance with the driving mode MD. In the present embodiment, a deceleration support control is executed such that deceleration of the vehicle 30 is supported in preparation for entrance of the vehicle 30 into a curve. The deceleration-speed requested value DecR is a target value of the deceleration speed of the vehicle 30 during the deceleration support control.

As illustrated in FIG. 8, the deceleration-speed requested value DecR for the first driving mode MD1 is a first deceleration-speed requested value Dec1. The deceleration-speed requested value DecR for the second driving mode MD2 is a second deceleration-speed requested value Dec2. The deceleration-speed requested value DecR for the third driving mode MD3 is a third deceleration-speed requested value Dec3. In a case where the vehicle 30 is decelerated, the stability in the vehicle behavior easily decreases as the deceleration speed is larger. Accordingly, the first deceleration-speed requested value Dec1 is smaller than the second deceleration-speed requested value Dec2 and the third deceleration-speed requested value Dec3. The third deceleration-speed requested value Dec3 is larger than the first deceleration-speed requested value Dec1 and the second deceleration-speed requested value Dec2.

Procedure of Process to Support Vehicle Operation Performed by Driver when Vehicle 30 Runs Along Course 101

FIG. 9 illustrates part of a processing routine to be executed by the CPU 22 of the server control device 21. The CPU 22 repeatedly executes this processing routine.

In the processing routine, the CPU 22 executes processes equivalent to steps S11 to S35 illustrated in FIG. 6. When the CPU 22 executes the process of step S35, the CPU 22 advances the process to step S37. In step S37, the CPU 22 acquires a deceleration distance Lg corresponding to the driving mode MD selected by the driver. Subsequently, in step S38, the CPU 22 acquires, from the table TL1 illustrated in FIG. 8, a deceleration-speed requested value DecR corresponding to the driving mode MD selected by the driver.

In subsequent step S39, the CPU 22 determines whether or not the vehicle 30 has entered the deceleration area, based on the currently-running area ARD and the deceleration distance Lg. In a case where the CPU 22 determines that the vehicle 30 has entered the deceleration area (S39: YES), the CPU 22 advances the process to step S41. In step S41, the CPU 22 turns on the deceleration flag FLGg. Then, the CPU 22 advances the process to step S45.

In the meantime, in step S39, in a case where the CPU 22 determines that the vehicle 30 has not entered the deceleration area (NO), the CPU 22 advances the process to step S43. In step S43, the CPU 22 turns off the deceleration flag FLGg. Then, the CPU 22 advances the process to step S45.

In step S45, the CPU 22 executes a transmission process of transmitting the vehicle speed appropriate value VLa, the deceleration-speed requested value DecR, and the deceleration flag FLGg from the server-side communications device 28 to the vehicle 30. After that, the CPU 22 ends this processing routine once.

FIG. 10 illustrates a processing routine to be executed by the CPU 41 of the vehicle control device 40. The CPU 41 repeatedly executes this processing routine.

In this processing routine, first, in step S71, the CPU 41 determines whether or not the CPU 41 has received the vehicle speed appropriate value VLa, the deceleration-speed requested value DecR, and the deceleration flag FLGg. In a case where the CPU 41 has not received the vehicle speed appropriate value VLa, the deceleration-speed requested value DecR, and the deceleration flag FLGg (S71: NO), the CPU 41 repeatedly executes the determination of step S71 until the CPU 41 has received them. In the meantime, in a case where the CPU 41 has received the vehicle speed appropriate value VLa, the deceleration-speed requested value DecR, and the deceleration flag FLGg (S71: YES), the CPU 41 advances the process to step S73.

In step S73, the CPU 41 acquires an estimated value of the road surface μ as the road-surface condition of the currently-running area ARD, similarly to step S53. Then, in step S75, the CPU 41 derives the vehicle speed appropriate value VL, similarly to step S55.

In subsequent step S77, the CPU 41 determines whether the deceleration flag FLGg received from the server 20 is turned off or not. In a case where the deceleration flag FLGg is turned off (S77: YES), the CPU 41 advances the process to step S79. In step S79, the CPU 41 executes the speed support control, similarly to step S57. After that, the CPU 41 ends this processing routine once.

In the meantime, in step S77, in a case where the deceleration flag FLGg is turned on (NO), the CPU 41 advances the process to step S81. In step S81, the CPU 41 executes the deceleration support control. For example, the CPU 41 drives the braking device 33 and the driving device 32 so that the deceleration speed of the vehicle 30 does not become smaller than the deceleration-speed requested value DecR. In this case, in a case where the deceleration speed of the vehicle 30 is larger than the deceleration-speed requested value DecR due to the brakes operation performed by the driver, the CPU 41 may not instruct the braking device 33 and the driving device 32 to be driven to decelerate the vehicle 30. After that, the CPU 41 ends this processing routine once.

In the present embodiment, in a case where the vehicle 30 is determined not to have entered the deceleration area, the speed support control is executed as the support process. That is, support based on the vehicle speed appropriate value VL is performed for the driver. In the meantime, in a case where the vehicle 30 is determined to have entered the deceleration area, the deceleration support control is executed as the support process. That is, support based on the deceleration-speed requested value DecR instead of the vehicle speed appropriate value VL is performed for the driver.

Correspondence

The correspondence between what is described in the present embodiment and what is described in the field of SUMMARY is as follows.

Step S21 corresponds to the "temperature acquisition process." Steps S19, S25, S29, S33, S35, and S75 correspond to the "appropriate value setting process." In the present embodiment, a plurality of vehicle speed candidate values is derived, and the vehicle speed appropriate value VL is set based on the vehicle speed candidate values. Particularly, step S25 corresponds to the process of driving, as the first vehicle speed candidate value VLa1, a value to be smaller as the tire temperature TMPty is lower. Steps S29, S33 correspond to the process of deriving the vehicle speed candidate values VLa2, VLa3 based on weather information. Step S19 corresponds to the process of setting the vehicle speed appropriate value VL based on the driving mode MD selected by the driver. Step S75 corresponds to the process of setting the vehicle speed appropriate value VL based on the road-surface condition.

Steps S77 to S81 correspond to the "support process." Particularly, step S79 corresponds to the "speed support control" by which at least either the driver is notified of the vehicle speed appropriate value VL or the vehicle is decelerated in a case where the vehicle speed V exceeds the vehicle speed appropriate value VL. Further, step S81 corresponds to the "deceleration support control" by which deceleration of the vehicle 30 is controlled in preparation for entrance of the vehicle 30 into a curve. Step S13 corresponds to the "specifying process." Step S73 corresponds to the "road-surface condition acquisition process." Step S38 corresponds to the "deceleration-speed requested value setting process" of setting the deceleration-speed requested value DecR.

The storage device 24 of the server control device 21 corresponds to the "storage device" in which a road where the vehicle 30 runs is stored such that the road is divided into a plurality of running areas AR. The CPU 22 of the server control device 21 and the CPU 41 of the vehicle control device 40 correspond to the "execution device" configured to execute the above processes. Further, the CPU 41 of the vehicle control device 40 corresponds to the "second execution device," and the CPU 22 of the server control device 21 corresponds to the "first execution device."

Each of the vehicle speed candidate values VLa1 to VLa3 corresponds to the "candidate value for the vehicle speed appropriate value." Among the vehicle speed candidate values VLa1 to VLa3, the first vehicle speed candidate value VLa1 corresponds to the "candidate value" derived as a value to be smaller as the tire temperature TMPty is lower.

Operations and Effects in Second Embodiment

The present embodiment can achieve the following effects in addition to effects similar to the effects of (1-1) to (1-7) and (1-9) in the first embodiment.

(2-1) When the vehicle 30 approaches a curve, the deceleration support control is executed in preparation for entrance of the vehicle 30 into the curve. Hereby, the deceleration of the vehicle 30 is controlled based on the deceleration-speed requested value DecR. As a result, regardless of whether the driver performs the vehicle operation to decelerate the vehicle 30 or not, it is possible to restrain such a situation that the vehicle 30 enters the curve with the vehicle speed V being lowered sufficiently.

(2-2) In a case where the vehicle 30 is decelerated, the stability in the vehicle behavior easily decreases as the deceleration speed is larger. In this regard, in the present embodiment, in a case where the first driving mode MD1 is selected by the driver, a value smaller than values to be set in cases where the other driving modes MD2 is selected is set as the deceleration-speed requested value DecR.

Here, a driver having a low skill for the vehicle operation is more likely to select the first driving mode MD1 rather than the second driving mode MD2 and the third driving mode MD3.

In a case where the first driving mode MD1 is selected by the driver, it is possible to restrain the deceleration speed of the vehicle 30 from becoming large at a stage before the vehicle 30 enters the curve, in comparison with cases where the other driving modes MD2, MD3 are selected. As a result, while the vehicle 30 is being decelerated in preparation for entrance of the vehicle 30 into the curve, the driver can feel relieved and perform steering.

Third Embodiment

Figure 11:
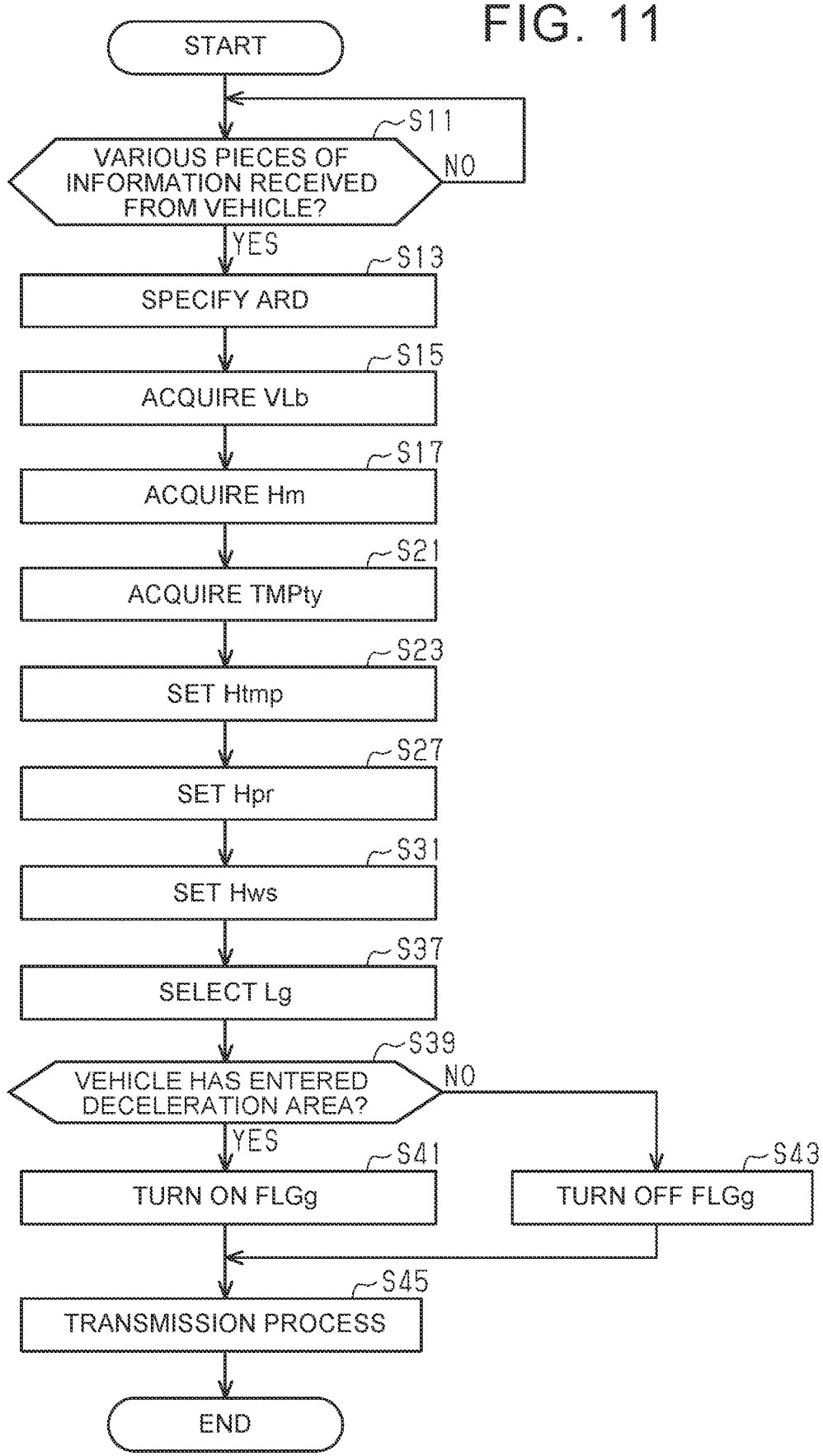
FIG. 11 is a flowchart to describe part of a processing routine to be executed by a CPU of a server in a running support system of a third embodiment.
Figure 12:
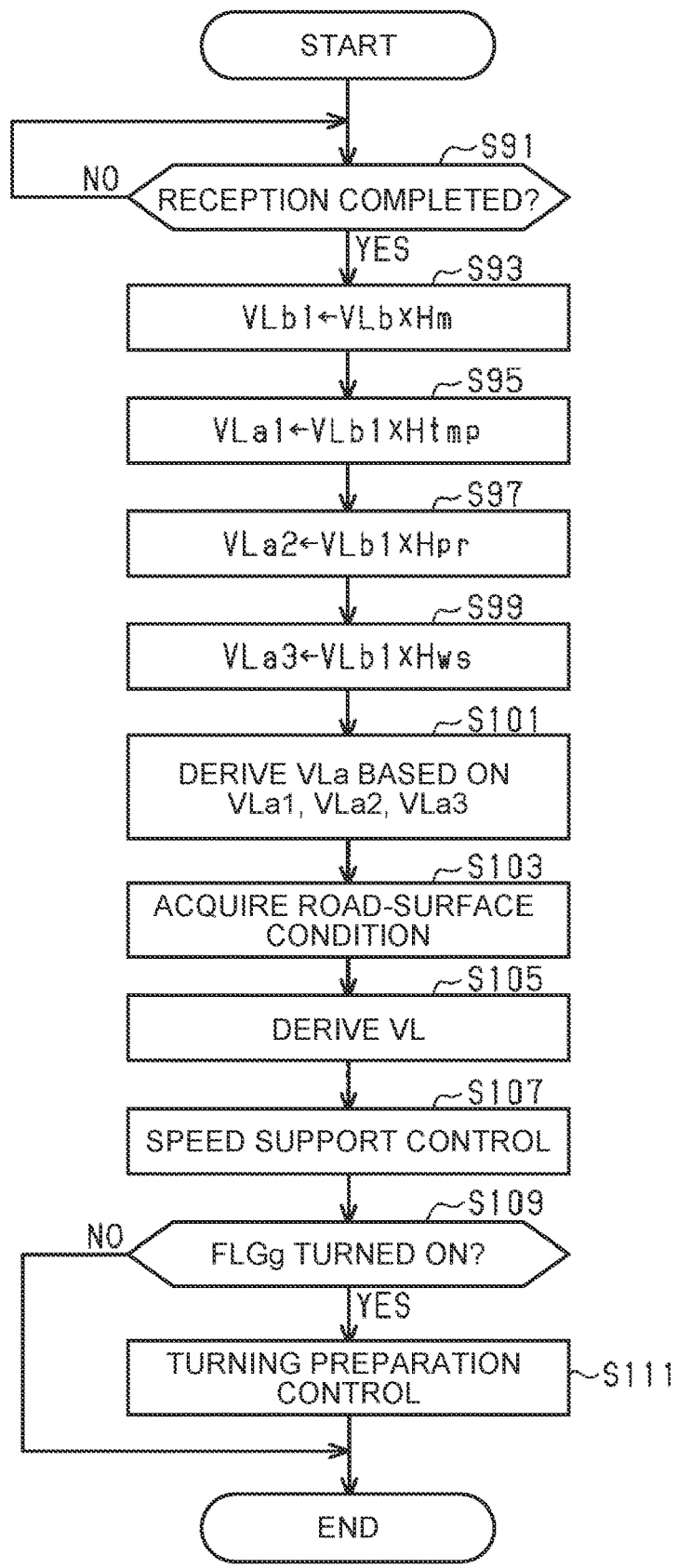
FIG. 12 is a flowchart to describe a processing routine to be executed by a CPU of a vehicle control device in the running support system.

The following describes a third embodiment of the running support system and the running support method with reference to FIGS. 11, 12. In the following description, parts different from the first embodiment will be mainly described. The same constituent as or a constituent equivalent to a constituent described in the above embodiments has the same reference sign as the constituent described in the above embodiments, and redundant descriptions about the constituent will be omitted.

Procedure of Process to Support Vehicle Operation Performed by Driver when Vehicle 30 Runs Along Course 101

FIG. 11 illustrates part of a processing routine to be executed by the CPU 22 of the server control device 21. The CPU 22 repeatedly executes this processing routine.

In this processing routine, in step S11, in a case where the CPU 22 has received various pieces of information from the vehicle 30 (YES), the CPU 22 specifies a currently-running area ARD in step S13. Subsequently, in step S15, the CPU 22 acquires a reference vehicle speed appropriate value VLb, and in step S17, the CPU 22 acquires a mode correction coefficient Hm. Further, in step S21, the CPU 22 acquires a tire temperature TMPty, and in step S23, the CPU 22 sets a tire temperature correction coefficient Htmp. Further, in step S27, the CPU 22 acquires a precipitation correction coefficient Hpr, and in step S31, the CPU 22 sets an airflow rate correction coefficient Hws.

Further, in step S37, the CPU 22 selects a deceleration distance Lg, and in step S39, the CPU 22 determines whether the vehicle 30 has entered the deceleration area or not. In a case where the CPU 22 determines that the vehicle 30 has entered the deceleration area (S39: YES), the CPU 22 turns on the deceleration flag FLGg in step S41. In the meantime, in a case where the CPU 22 determines that the vehicle 30 has not entered the deceleration area (S39: NO), the CPU 22 turns off the deceleration flag FLGg in step S43.

Then, in step S45, the CPU 22 transmits the reference vehicle speed appropriate value VLb, the correction coefficients Hm, Htmp, Hpr, Hws, and the deceleration flag FLGg from the server-side communications device 28 to the vehicle 30. After that, the CPU 22 ends this processing routine once.

FIG. 12 illustrates a processing routine to be executed by the CPU 41 of the vehicle control device 40. The CPU 41 repeatedly executes this processing routine.

In this processing routine, first, in step S91, the CPU 41 determines whether or not the CPU 41 has received the reference vehicle speed appropriate value VLb, the correction coefficients Hm, Htmp, Hpr, Hws, and the deceleration flag FLGg. In a case where the CPU 41 has not received at least any one of the reference vehicle speed appropriate value VLb, the correction coefficients Hm, Htmp, Hpr, Hws, and the deceleration flag FLGg (S91: NO), the CPU 41 repeatedly executes the determination of step S91 until the CPU 41 has received them. In the meantime, in a case where the CPU 41 has received the reference vehicle speed appropriate value VLb, the correction coefficients Hm, Htmp, Hpr, Hws, and the deceleration flag FLGg (S91: YES), the CPU 41 advances the process to step S93.

In step S93, the CPU 41 derives, as a corrected reference vehicle speed appropriate value VLb1, the product of the reference vehicle speed appropriate value VLb and the mode correction coefficient Hm, similarly to step S19. In subsequent step S95, the CPU 41 derives, as a first vehicle speed candidate value VLa1, the product of the corrected reference vehicle speed appropriate value VLb1 and the tire temperature correction coefficient Htmp, similarly to step S25. Subsequently, in step S97, the CPU 41 derives, as a second vehicle speed candidate value VLa2, the product of the corrected reference vehicle speed appropriate value VLb1 and the precipitation correction coefficient Hpr, similarly to step S29. In subsequent step S99, the CPU 41 derives, as a third vehicle speed candidate value VLa3, the product of the corrected reference vehicle speed appropriate value VLb1 and the airflow rate correction coefficient Hws, similarly to step S33.

Then, in step S101, the CPU 41 derives a vehicle speed appropriate value VLa based on the first vehicle speed candidate value VLa1, the second vehicle speed candidate value VLa2, and the third vehicle speed candidate value VLa3, similarly to step S35.

In subsequent step S103, the CPU 41 acquires the road-surface condition of the currently-running area ARD, similarly to step S53. Subsequently, in step S105, the CPU 41 derives a vehicle speed appropriate value VL based on the vehicle speed appropriate value VLa and the road-surface condition, similarly to step S55. Then, in step S107, the CPU 41 executes the speed support control, similarly to step S57.

In step S109, the CPU 41 determines whether the deceleration flag FLGg is turned on or not, similarly to step S59. In a case where the deceleration flag FLGg is turned on (S109: YES), the CPU 41 advances the process to step S111. In the meantime, in a case where the deceleration flag FLGg is turned off (S109: NO), the CPU 41 ends this processing routine once.

In step S111, the CPU 41 executes the turning preparation control, similarly to step S61. After that, the CPU 41 ends this processing routine once.

Correspondence

The correspondence between what is described in the present embodiment and what is described in the field of SUMMARY is as follows.

Step S21 corresponds to the "temperature acquisition process." Steps S93 to S101 and S105 correspond to the "appropriate value setting process." In the present embodiment, a plurality of vehicle speed candidate values is derived, and the vehicle speed appropriate value VL is set based on the vehicle speed candidate values. Particularly, step S95 corresponds to the process of driving, as the first vehicle speed candidate value VLa1, a value to be smaller as the tire temperature TMPty is lower. Steps S97, S99 correspond to the process of deriving the vehicle speed candidate values VLa2, VLa3 based on weather information. Step S93 corresponds to the process of setting the vehicle speed appropriate value VL based on the driving mode MD selected by the driver. Step S105 corresponds to the process of setting the vehicle speed appropriate value VL based on the road-surface condition.

Steps S107, S111 correspond to the "support process." Particularly, step S107 corresponds to the "speed support control" by which at least either the driver is notified of the vehicle speed appropriate value VL or the vehicle is decelerated in a case where the vehicle speed V exceeds the vehicle speed appropriate value VL. Further, step S111 correspond to the "turning preparation control." Step S13 corresponds to the "specifying process." Step S103 corresponds to the "road-surface condition acquisition process."

The storage device 24 of the server control device 21 corresponds to the "storage device." The CPU 22 of the server control device 21 and the CPU 41 of the vehicle control device 40 correspond to the "execution device." Further, the CPU 41 of the vehicle control device 40 corresponds to the "second execution device," and the CPU 22 of the server control device 21 corresponds to the "first execution device."

Each of the vehicle speed candidate values VLa1 to VLa3 corresponds to the "candidate value for the vehicle speed appropriate value." Among the vehicle speed candidate values VLa1 to VLa3, the first vehicle speed candidate value VLa1 corresponds to the "candidate value" derived as a value to be smaller as the tire temperature TMPty is lower.

Operations and Effects in Third Embodiment

The present embodiment can achieve the following effect in addition to effects similar to the effects of (1-1) to (1-9) in the first embodiment.

(3-1) In the present embodiment, some of the processes to be executed by the CPU 22 of the server control device 21 in the first embodiment are executed by the CPU 41 of the vehicle control device 40. Hereby, it is possible to reduce a control load to the server control device 21.

Modifications

The embodiments can also be carried out by adding changes as stated below. The embodiments and the following modifications can be carried out in combination as long as they do not cause any technical inconsistencies.

In each of the above embodiments, various processes constituting the running support method are executed by the CPU 22 of the server control device 21 and the CPU 41 of the vehicle control device 40 in a divided manner. However, all the processes constituting the running support method may be executed by the CPU 41 of the vehicle control device 40.

In this case, in a case where the vehicle 30 runs along the course 101 managed by the server 20, all the running areas AR illustrated in FIG. 3, the map MP illustrated in FIG. 4, and the data table TL, TL1 illustrated in FIG. 5, 8 are transmitted from the server 20 to the vehicle 30 prior to the start of running. Then, various pieces of information thus received are stored in the storage device 43 of the vehicle control device 40.

In a case where the vehicle 30 is running along the course 101 in this state, the CPU 41 can set the vehicle speed appropriate value VL similarly to the above embodiments.

In this modification, the CPU 41 of the vehicle control device 40 corresponds to the "execution device," and the storage device 43 corresponds to the "storage device."

In each of the above embodiments, only either one control out of the deceleration support control and the turning preparation control is executed, but both the deceleration support control and the turning preparation control may be executed.

A control to be executed may be selected from the deceleration support control and the turning preparation control in accordance with the driving mode MD selected by the driver. For example, in a case where the first driving mode MD1 is selected, both the deceleration support control and the turning preparation control may be executed. Further, for example, in a case where the second driving mode MD2 is selected, only the deceleration support control out of the deceleration support control and the turning preparation control may be executed. Further, for example, in a case where the third driving mode MD3 is selected, only the turning preparation control out of the deceleration support control and the turning preparation control may be executed.

The deceleration distance Lg may not be changed in accordance with the driving mode MD selected by the driver.

The deceleration-speed requested value DecR may not be changed in accordance with the driving mode MD selected by the driver.

The support process may not include the deceleration support control and the turning preparation control.

In each of the above embodiments, the smallest value among the first vehicle speed candidate value VLa1, the second vehicle speed candidate value VLa2, and the third vehicle speed candidate value VLa3 is derived as the vehicle speed appropriate value VLa. However, the applicable embodiment is not limited to this. That is, the vehicle speed appropriate value VLa should be derived based on the first vehicle speed candidate value VLa1, the second vehicle speed candidate value VLa2, and the third vehicle speed candidate value VLa3. For example, an average value of the vehicle speed candidate values VLa1, VLa2, VLa3 may be derived as the vehicle speed appropriate value VL. Further, for example, the second smallest value among the vehicle speed candidate values VLa1, VLa2, VLa3 may be derived as the vehicle speed appropriate value VL.

In each of the above embodiments, the vehicle speed appropriate value VL can be changed in accordance with the driving mode MD selected by the driver. However, the applicable embodiment is not limited to this. That is, the vehicle speed appropriate value VL may not be changed in accordance with the driving mode MD selected by the driver.

In each of the above embodiments, the vehicle speed appropriate value VL can be changed in accordance with the amount of precipitation in the circuit field 100. However, the applicable embodiment is not limited to this. That is, the vehicle speed appropriate value VL may not be changed in accordance with the amount of precipitation in the circuit field 100.

In each of the above embodiments, the vehicle speed appropriate value VL can be changed in accordance with the airflow rate in the circuit field 100. However, the applicable embodiment is not limited to this. That is, the vehicle speed appropriate value VL may not be changed in accordance with the airflow rate in the circuit field 100.

In each of the above embodiments, the vehicle speed appropriate value VL can be changed in accordance with the weather in the circuit field 100. However, the applicable embodiment is not limited to this. That is, the vehicle speed appropriate value VL may not be changed in accordance with the weather in the circuit field 100.

As long as the vehicle speed appropriate value VL is corrected in accordance with the estimated value of the road surface the vehicle speed appropriate value VL may be corrected in accordance with the estimated value of the road surface µ by use of a technique different from the technique described in each of the above embodiments. For example, the vehicle speed appropriate value VL may be corrected so that a correction amount is larger as the estimated value of the road surface µ is smaller.

The vehicle speed may not be changed in accordance with the estimated value of the road surface µ. In this case, the road-surface condition acquisition process may be omitted.

The vehicle speed appropriate value VL may not be changed in accordance with the currently-running area ARD. In this case, the specifying process may not be executed.

In each of the above embodiments, the tire temperature TMPty is acquired based on the number of laps. However, the applicable embodiment is not limited to this. For example, the running distance after the vehicle 30 starts moving on the course 101 may be measured, and a value corresponding to the running distance thus measured may be acquired as the tire temperature TMPty.

That the tire temperature TMPty is acquired based on the running distance after the vehicle 30 starts moving on the course 101 is one example. For example, in a case where the vehicle 30 includes a detection system configured to detect the temperature of the tires, a detection value of the temperature of the tires may be acquired as the tire temperature TMPty.

In the speed support control, the control by which the vehicle 30 is decelerated in a case where the vehicle speed V exceeds the vehicle speed appropriate value VL may not be executed, provided that the driver is notified of the vehicle speed appropriate value VL.

In the speed support control, the control by which the driver is notified of the vehicle speed appropriate value VL may not be executed, provided that the control by which the vehicle 30 is decelerated in a case where the vehicle speed V exceeds the vehicle speed appropriate value VL is executed.

In the first embodiment and the third embodiment, in a case where the driver performs the brakes operation during the execution of the turning preparation control, the speed support control may not be executed.

In each of the above embodiments, a vehicle having three driving modes MD1 to MD3 as the driving mode MD selectable by the driver is employed as the vehicle 30. However, the applicable embodiment is not limited to this. For example, a vehicle having two driving modes as the driving mode MD selectable by the driver may be employed as the vehicle 30. Further, for example, a vehicle having four driving modes or more as the driving mode MD selectable by the driver may be employed as the vehicle 30.

In each of the above embodiments, a vehicle in which the driving mode MD is not selectable by the driver may be employed as the vehicle 30. In this case, the vehicle speed appropriate value VL cannot be changed in accordance with the driving mode.

The above embodiments deal with a case where the vehicle runs along the course 101 in the circuit field 100. However, the applicable embodiment is not limited to this. For example, the running support system may be applied to a case where the vehicle 30 runs on a public road. That is, in a case where the vehicle 30 is running on a road, the tire temperature TMPty is acquired. A value to be smaller as the tire temperature TMPty is lower is derived as a candidate value for the vehicle speed appropriate value, and the vehicle speed appropriate value VL is set based on the candidate value. Even in this case, the support process is executed based on the vehicle speed appropriate value VL.

The running support system 10 is not limited to a system including a CPU and a memory in which a program is stored and configured to execute a software process. That is, the running support system 10 should have any of the following configurations (a) to (c).

(a) The running support system 10 includes one or more processors configured to execute various processes in accordance with a computer program. The processor includes a CPU and a memory such as a RANI or a ROM. A program code or a command configured to cause the CPU to execute a process is stored in the memory. The memory, that is, a computer-readable medium includes all available media accessible by a general-purpose or exclusive computer.

(b) The running support system 10 includes one or more exclusive hardware circuitry configured to execute various processes. The exclusive hardware circuitry can include, for example, an application specific integrated circuit, namely, ASIC, or FPGA. Note that the "ASIC" is an abbreviation of Application Specific Integrated Circuit. The "FPGA" is an abbreviation of Field-Programmable Gate Array.

(c) The running support system 10 includes a processor configured to execute some of various processes in accordance with a computer program, and an exclusive hardware circuitry configured to execute remaining processes of the various processes.

The following describes a technical idea that can be grasped from the above embodiments and the modifications.

(1) A running support system for a vehicle, the running support system being for supporting a vehicle operation performed by a driver during vehicle running, the running support system including an execution device. The execution device is configured to execute processes including:

an index acquisition process of, in a case where the vehicle runs along a specific course, acquiring an index indicative of a degree of familiarity of the driver with a vehicle operation to drive the vehicle along the course;

an appropriate value setting process of setting a vehicle speed appropriate value that is an appropriate vehicle speed while the vehicle is running; and a support process of performing at least either notifying the driver of the vehicle speed appropriate value or decelerating the vehicle in a case where a vehicle speed exceeds the vehicle speed appropriate value.

In the appropriate value setting process, the execution device derives, as a candidate value for the vehicle speed appropriate value, a value to be smaller as the degree of familiarity estimated from the index is lower, and the execution device sets the vehicle speed appropriate value based on the candidate value.

In a case where the driver drives the vehicle along a course that the driver is not familiar with, it is desirable to restrain the vehicle speed from becoming high, in order to secure the safety in the vehicle. In view of this, in the above configuration, in a case where the driver is not familiar with a vehicle operation to be performed when the driver drives the vehicle along a specific course, a value smaller than a value to be set in a case where the driver is familiar with the vehicle operation to be performed when the driver drives the vehicle along the specific course is set as the vehicle speed appropriate value. Then, in the support process, the driver is notified of the vehicle speed appropriate value, or the vehicle is decelerated so that the vehicle speed does not exceed the vehicle speed appropriate value. That is, with the above configuration, a value corresponding to the degree of familiarity of the driver can be set as the vehicle speed appropriate value.

What is claimed is:

1. A running support system for a vehicle, the running support system being for supporting a vehicle operation performed by a driver during vehicle running, the running support system comprising:
    an execution device configured to execute processes including:
        a temperature acquisition process of acquiring a tire temperature that is a temperature of tires of the vehicle,
        a value setting process of setting a vehicle speed value that is an vehicle speed when the vehicle runs, and
        a support process of performing at least either notifying the driver of the vehicle speed value or decelerating the vehicle in a case where a vehicle speed exceeds the vehicle speed value,
    wherein, in the value setting process, the execution device is configured to:
        derive a plurality of candidate values for the vehicle speed value, one of the candidate values for the vehicle speed value being a value to be smaller as the tire temperature is lower, and
        set the vehicle speed value based on one or more of the candidate values.

2. The running support system according to claim 1, wherein, in the temperature acquisition process, the execution device is configured to acquire, as the tire temperature, a temperature to be higher as a running distance after the vehicle starts moving is longer.

3. The running support system according to claim 1, further comprising a storage device in which a road where the vehicle runs is stored such that the road is divided into a plurality of running areas, wherein:
    the storage device includes a map in which respective reference vehicle speed values for respective running areas are stored as references for the vehicle speed value;
    the processes that the execution device is configured to execute include a specifying process of specifying a currently-running area from among the running areas, the currently-running area being a running area where the vehicle is running; and
    in the value setting process, the execution device is configured to derive the candidate values based on the tire temperature and a reference vehicle speed value corresponding to the currently-running area, the reference vehicle speed value being acquired from the map.

4. The running support system according to claim 1, wherein:
    the processes that the execution device is configured to execute include a road-surface condition acquisition process of acquiring a road surface μ as a road-surface condition that is a condition of a road surface on which the vehicle is running; and
    in the value setting process, in a case where the road surface μ is less than a determination value, the execution device is configured to set, as the vehicle speed value, a value smaller than a value to be set in a case where the road surface μ is equal to or more than the determination value.

5. The running support system according to claim 1, wherein, in the value setting process, the execution device is configured to set the vehicle speed value based on weather information that is information on weather.

6. The running support system according to claim 1, wherein:
- a first driving mode and a second driving mode are prepared in the vehicle as a driving mode selectable by the driver;
- the first driving mode is a driving mode in which the vehicle speed is restrained from becoming high as compared to the second driving mode;
- in the value setting process, in a case where the first driving mode is selected by the driver, the execution device is configured to set, as the vehicle speed value, a value smaller than a value to be set in a case where the second driving mode is selected by the driver.

7. The running support system according to claim 6, wherein:
- the support process includes a turning preparation control by which the driver is requested to decelerate the vehicle in preparation for entrance of the vehicle into a curve; and
- in the support process, in a case where the first driving mode is selected by the driver, the turning preparation control is started more before the curve in comparison with a case where the second driving mode is selected by the driver.

8. The running support system according to claim 6, wherein:
- the support process includes a deceleration support control by which deceleration of the vehicle is controlled in preparation for entrance of the vehicle into a curve;
- the processes to be executed by the execution device includes a deceleration-speed requested value setting process of setting a deceleration-speed requested value that is a requested value for a deceleration speed of the vehicle;
- in the deceleration support control, the deceleration of the vehicle is controlled based on the deceleration-speed requested value; and
- in the deceleration-speed requested value setting process, in a case where the first driving mode is selected by the driver, the execution device is configured to set, as the deceleration-speed requested value, a value smaller than a value to be set in a case where the second driving mode is selected by the driver.

9. The running support system according to claim 1, wherein:
- the execution device includes a first execution device provided outside the vehicle and a second execution device provided in the vehicle;
- the first execution device and the second execution device transmit and receive information to and from each other; and
- the second execution device executes some processes including the support process from among the processes and the first execution device executes remaining processes of the processes.

10. A running support method for a vehicle, the running support method being for supporting a vehicle operation performed by a driver during vehicle running, the running support method comprising:
- a temperature acquisition process of acquiring a tire temperature that is a temperature of tires of the vehicle;
- an value setting process of setting a vehicle speed value that is an vehicle speed when the vehicle runs; and
- a support process of at least either notifying the driver of the vehicle speed value set in the value setting process or decelerating the vehicle in a case where a vehicle speed of the vehicle exceeds the vehicle speed value, wherein:
- the support process is executed by an execution device provided in the vehicle; and
- the value setting process includes:
    - deriving a plurality of candidate values for the vehicle speed value, one of the candidate values for the vehicle speed value being a value to be smaller as the tire temperature is lower, and
    - setting the vehicle speed value based on one or more of the candidate values.

11. The running support system according to claim 1, wherein, in the value setting process, the execution device is configured to set the vehicle speed value based on a minimum value among the candidate values.

12. The running support system according to claim 1, wherein, in the value setting process, the execution device is configured to set the vehicle speed value based on an average value of the candidate values.

13. The running support system according to claim 1, wherein, in the value setting process, the execution device is configured to:
- acquire a reference vehicle speed value; and
- correct the reference vehicle speed value based on the tire temperature to derive the one of the candidate values that is the value to be smaller as the tire temperature is lower.

* * * * *